US006491396B2

(12) United States Patent
Karasawa et al.

(10) Patent No.: US 6,491,396 B2
(45) Date of Patent: Dec. 10, 2002

(54) PROJECTOR MODULATING A PLURALITY OF PARTIAL LUMINOUS FLUXES ACCORDING TO IMAGING INFORMATION BY MEANS OF AN ELECTRO-OPTICAL DEVICE

(75) Inventors: Joji Karasawa, Okaya (JP); Yoshitaka Ito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 24 days.

(21) Appl. No.: 09/781,959

(22) Filed: Feb. 14, 2001

(65) Prior Publication Data

US 2001/0033367 A1 Oct. 25, 2001

(30) Foreign Application Priority Data

| Feb. 15, 2000 | (JP) | ................................. | 2000-036844 |
| Feb. 16, 2000 | (JP) | ................................. | 2000-037721 |
| Jan. 9, 2001 | (JP) | ................................. | 2001-001860 |
| Jan. 16, 2001 | (JP) | ................................. | 2001-007915 |

(51) Int. Cl.[7] ................... G03B 21/14; G03B 21/00; G03B 21/26; G02F 1/1335; G02B 5/00
(52) U.S. Cl. ........................ 353/20; 353/31; 353/34; 353/38; 353/99; 349/7; 349/9; 359/894
(58) Field of Search ....................... 353/20, 38, 98, 353/99, 31, 33, 34, 37; 349/5, 7, 8, 9; 359/894

(56) References Cited

U.S. PATENT DOCUMENTS

| 5,884,991 A | * | 3/1999 | Levis et al. .............. 353/122 |
| 6,332,684 B1 | * | 12/2001 | Shibatani et al. .......... 353/31 |
| 6,375,330 B1 | * | 4/2002 | Mihalakis ................. 353/31 |

FOREIGN PATENT DOCUMENTS

| JP | 4-60538 A | 2/1992 |
| JP | 10-232430 A | 9/1998 |
| JP | 11-32348 A | 2/1999 |
| JP | 11-202429 A | 7/1999 |

\* cited by examiner

*Primary Examiner*—Russell Adams
*Assistant Examiner*—Magda Cruz
(74) *Attorney, Agent, or Firm*—Oliff & Berridge, PLC

(57) ABSTRACT

The invention relates to methods and systems that suppress the expansion of an illuminating luminous flux in the short-side direction of a sub-pixel and prevents a color mixture caused by leak of light to an adjacent pixel electrode. The methods and systems of the invention set the direction of polarization separation, using a polarization transforming element, as the long-side direction of a sub-pixel with respect to the directions of the short sides and the long sides of sub-pixels arranged correspondingly to a microlens. The methods and systems of the invention also make the intervals between light source images narrower in the short-side direction, using a luminous flux separation optical element.

24 Claims, 21 Drawing Sheets

PROJECTOR MODULATING A PLURALITY OF PARTIAL LUMINOUS FLUXES ACCORDING TO IMAGING INFORMATION BY MEANS OF AN ELECTRO-OPTICAL DEVICE

BACKGROUND OF THE INVENTION

1. Field of the Invention

The present invention relates to a projector which separates a luminous flux from a light source into a plurality of partial luminous fluxes and modulates the plurality of partial luminous fluxes according to image information by means of an electro-optic device.

2. Description of Related Art

As a projector capable of projecting and displaying a color image, in addition to a projector of a three-plate type provided with an electro-optic device for each of three color lights, a projector of a single-plate type forming a color image by means of a single electro-optic device has been put to practical use.

A projector of a single-plate type has an advantage of making it possible to easily make a projector apparatus smaller in size and lower in cost.

There are various forms of single-plate type projectors, and among them a single-plate type projector which irradiates a single liquid crystal display device (electro-optic device) provided with a microlens array with color lights obtained by color separation by means of three dichroic mirrors (a color separation optical element) arranged at specific positions like a color liquid crystal display device disclosed in Japanese Patent Laid-Open Publication No. Hei 4-60,538 is well known (hereinafter an electro-optic device of such a composition is called an electro-optic device of a spatial color separation type). A projector of such a form attracts public attention in that it has a high efficiency of light utilization and can easily provide a bright projected image in spite of its single-plate type.

Further, a single-plate type projector as described above is contrived so as to arrange various optical elements such as a luminous flux separation optical element, a polarization transforming element, a color separation optical element and the like in an optical path from a light source to an electro-optic devise, utilize light of the light source without waste, and thereby form a projected image being not irregular in brightness and color.

A luminous flux separation optical element is an optical element which separates a luminous flux from a light source into a plurality of partial luminous fluxes, forms a plurality of light source images in a virtual plane nearly perpendicular to a virtual optical axis of illumination passing nearly the center of the said luminous flux separation optical element, superposes luminous fluxes from the plurality of light source images on an electro-optic device by considering them as pseudo-light sources, and thereby obtains illuminating luminous fluxes being uniform in distribution of intensity. Concretely, as a luminous flux separation optical element, a bar-type optical conductor which reflects a luminous flux inputted from the entrance end by plural pairs of reflecting faces, separates the luminous flux into a plurality of partial luminous fluxes according to different positions of reflection and outputs them from the exit end, a lens array having a plurality of lenses arranged in a plane opposite to the pixel area of an electro-optic device, or the like is adopted.

A polarization transforming element is an optical element which separates an incident luminous flux being random in direction of polarization direction into two polarized luminous fluxes, rotates the polarization direction at least one of the two polarized luminous fluxes, and thereby outputs luminous fluxes being uniform in direction of polarization. Concretely, a polarization transforming element comprises a polarization separating film which transmits one of two polarized luminous fluxes being different in direction of polarization from each other and reflects the other, a reflecting film which reflects the other polarized luminous flux separated, and a retardation plate which turns either of the two polarized luminous fluxes in direction of polarization.

A color separation optical element is an optical element which separates an incident luminous flux into a plurality of color lights such as R, G, B and the like for example, in which three dichroic mirrors to respectively reflect red, green and blue lights are arranged at different angles from one another with respect to the direction of incidence of a luminous flux and the respective color lights separated by the three dichroic mirrors are outputted at different angles from one another.

An electro-optic device of a spatial color separation type modulates each of luminous fluxes separated by said color separation optical element according to its image information for each color light and forms a color image. In the electro-optic device, three rectangular sub-pixels respectively corresponding to R, G and B lights are arranged side by side, and one microlens is formed for these three sub-pixels. The respective color lights incident upon the microlens at different angles are condensed by the microlens, enter their corresponding sub-pixels and are modulated for their respective colors and then outputted through a projection lens to form a color image projected.

Thus, a pixel area obtained by combining R, G and B sub-pixels in an electro-optic device is formed into a nearly square shape, and a sub-pixel to be modulated for each color light is formed by dividing said nearly square-shaped pixel area along the direction of incidence of each color light. In other words, a sub-pixel is formed into the shape of a rectangle having its short sides in the direction of color separation performed by the color separation optical system.

However, since a sub-pixel for each color light is formed into the shape of a rectangle in a single-plate type projector of such a structure, when a inclined light in the short-side direction of the rectangle is entered, a different color light is mixed into an adjacent sub-pixel and the color light leaks to a sub-pixel for another color light to generate a color mixture, and as a result, an image projected on a screen is degraded in contrast and color reproducibility. In a single-plate type projector, therefore, it is important how the angular distribution of lights incident on an electro-optic device in the short-side direction. is controlled.

SUMMARY OF THE INVENTION

An object of the present invention is to provide a single-plate type projector using an electro-optic device of a spatial color separation type, said projector preventing a color mixture and being high in contrast and color reproducibility.

(1) A projector according to the present invention is a projector comprising;

a luminous flux separation optical element that separates a luminous flux from a light source into a plurality of partial luminous fluxes, a polarization transforming element that separates each of said plurality of partial luminous fluxes into two polarized luminous fluxes and then converts the two luminous fluxes into a single polarized luminous fluxes being uniform in direction of polarization, an electro-optic device that modulates an illuminating luminous flux outputted from said polarization transforming element, said electro-optic device having a plurality of long and narrow pixels respectively corresponding to color lights and being arranged adjacently to one another, and a projection lens that projects a luminous flux modulated by said electro-optic device, and a direction of polarization separation of said plurality of partial luminous fluxes performed by said polarization transforming element coincides nearly with the long-side direction of said pixel.

In case of disposing a polarization transforming element between a light source and an electro-optic device for the purpose of improving the efficiency of utilizing light, an angular distribution of light is spread in direction of polarization separation due to separation of polarization by the polarization transforming element. In the present invention, however, since the direction of polarization separation by the polarization transforming element corresponds to the long-side direction of a pixel in an electro-optic device, an angular distribution of illuminating fluxes is spread in the long-side direction of a pixel but is little spread in the short-side direction of the pixel. Therefore, it is possible to reduce a color mixture (leak of light) caused by a different color light to enter an adjacent pixel and attain a projected image being high in contrast and excellent in color reproducibility.

(2) As for an electro-optic device, it is preferable that the present invention is applied to an electro-optic device of a transmission type which modulates an incident luminous flux with said pixels and outputs the luminous flux at the opposite side to the entrance side.

It is a matter of course that the present invention can be also applied to an electro-optic device of a reflection type which modulates an incident luminous flux and then outputs the luminous flux at the entrance side. In such a case, however, since polarization selecting elements such as polarization beam splitters and the like are disposed between an electro-optic device and an illuminator and between an electro-optic device and a projection lens, it is necessary to optimize characteristics of the polarization transforming element and the luminous flux separation optical element in order to keep the characteristics of the polarization selecting element. On the other hand, since an electro-optic device of a transmission type does not need such a polarization selecting element, it has an advantage of easily forming a projector in no consideration of the characteristics of a polarization selecting element.

(3) A luminous separation optical element is preferably composed so as to form a plurality of light source images at intervals more narrow in the short-side direction of a pixel than the long-side direction.

By making more narrow the intervals between light source images in the short-side direction of a pixel, it is possible to surely reduce the expansion of an angular distribution of illuminating luminous fluxes in the short-side direction of a pixel. Accordingly, it is possible to reduce a color mixture caused by leak of light to an adjacent pixel and attain a projected image being very high in contrast and excellent in color reproducibility.

(3-1) As a luminous flux separation optical element, a rod can be adopted which reflects an incident luminous flux entered through the entrance end from a light source by plural pairs of reflecting faces, separates the luminous flux into a plurality of partial luminous fluxes, and outputs them from the exit end.

In this case, as such a rod it is possible to adopt a solid rod made of a material having an optical conductivity or a hollow rod made by forming light reflecting faces on the inner faces of a tube. Since a solid rod has a total reflection faces with no optical loss, it has an advantage of improving the efficiency of light utilization. Since a hollow rod makes an incident luminous flux entered from the entrance end reach the exit end through the air layer inside the rod, it has an advantage that a uniform illuminating luminous flux can be attained even by making comparatively short the distance between the entrance end and the exit end and further it is easier to manufacture than the solid rod.

In case of using a solid rod or a hollow rod, it is enough that at least two pairs of reflection faces being opposite to each other in the long-side direction and the short-side direction of a pixel, and the section of the rod may be in the shape of such a polygon having more sides than a tetragon as an octagon, a dodecagon and the like.

However, taking account of the efficiency of optical transmission from a light source to a luminous flux separation optical element, since the section of a luminous flux incident on the luminous flux separation optical element from the light source is nearly circular in shape, it is preferable that the shape of the entrance end of the rod is a square, and taking account of the efficiency of illumination to an electro-optic device, it is preferable that the shape of the exit end of the rod is nearly similar to the shape of a display area of the electro-optic device.

In case of adopting a rod as described above as a luminous flux separation optical element, a plurality of light source images can be formed at more narrow intervals in the short-side direction than the long-side direction of a pixel by inclining a pair of reflecting faces opposite to each other in the short-side direction of a pixel so as to be made gradually wider from the entrance end toward the exit end. Accordingly, it is possible to reduce a color mixture caused by leak of light to an adjacent pixel and attain a projected image being very high in contrast and excellent in color reproducibility.

And further, the interval between a pair of reflection faces of a rod being opposite to each other in the long-side direction of a pixel may be made gradually more narrow from the entrance end toward the exit end of the rod.

In this case, since the intervals between light source images in the long-side direction of pixels can be made wider, the interval between the polarization separation film of a polarization transforming element and the reflection face can be set as sufficiently taking account of the size of a light source image. Therefore, it is possible to improve the efficiency of polarization transformation in a polarization transforming element and, as a result, improve the efficiency of light utilization in a projector.

(3-2) As a luminous flux separation element, a lens array formed by arranging a plurality of lenses in the long-side direction and the short-side direction of a pixel in an electro-optic device can be adopted.

In this case, it is preferable that the light condensing characteristics of the plurality of lenses are set so as to form a plurality of light source images at more narrow intervals in the short-side direction of a pixel than the long-side direction. The extent of an angular distribution of illuminating luminous fluxes in the short-side direction of a pixel can he surely reduced by setting the light condensing characteristic of each lens in such a way. Accordingly, it is possible to reduce a color mixture caused by leak of light to an adjacent pixel and attain a projected image being very high in contrast and excellent in color reproducibility.

Hereupon, as a lens forming a lens array, a hologram lens or diffraction lens for condensing light by means of a holography or diffraction effect can be adopted in addition to a general lens whose surface is formed into the shape of a curve.

In case of adopting a lens array as a luminous flux separation optical element, it is preferable that a plurality of lenses each are similar in shape to a display area of an electro-optic device. An image formed on a lens of a lens array is superposed on a display area being a single area to be illuminated in the electro-optic device. Accordingly, since a luminous flux outputted from the lens can be introduced into the display area with no waste by making the shape of a lens nearly similar to the shape of a display area of the electro-optic device, the efficiency of illumination can be improved.

And it is preferable that some or all of a plurality of lenses forming a lens array are eccentric lenses. Namely, since a light source image can be formed at a position other than the physical center of each lens by using eccentric lenses as some or all of lenses, it is possible to freely control the intervals between a plurality of light source images formed in a virtual plane.

(4) In case of using a lens array as a luminous flux separation optical element, it is preferable to dispose a reducing optical system in an optical path between a light source and a polarization transforming element. And by reducing the total sectional dimensions of an illuminating luminous flux in the short-side direction of a pixel, it is possible to further reduce the extent of an angular distribution of the illuminating luminous flux in the short-side direction of a pixel.

Accordingly, it is possible to reduce a color mixture caused by leak of light to an adjacent pixel and attain a projected image being very high in contrast and excellent in color reproducibility. And since the total diameter of a luminous flux to illuminate an area to be illuminated can be made smaller, it is possible to use a projection lens being small in aperture and inexpensive in cost as a projection lens disposed at the exit face side of an electro-optic device and make a projector low in cost.

And in this case, not only the sectional dimensions in the short-side direction of a pixel but also the sectional dimensions in the long-side direction of a pixel may be reduced. In such a case, a color mixture caused by leak of light to an adjacent pixel can be furthermore reduced.

Such a reducing optical system can be composed of at least one convex lens disposed at one of the entrance side and the exit side of a lens array and at least one concave lens disposed at the entrance side of a polarization transforming element. And in case of making small the sectional dimension of an illuminating luminous flux only in the short-side direction of a pixel, cylindrical lenses can be used as a concave lens and a convex lens. The convex lens and concave lens each can be composed of a single lens, but considering reduction of their optical aberrations, it is preferable that each of them is a combination lens obtained by combining a plurality of lenses.

(5) In a projector as described above, a reducing optical system for reducing the total sectional dimensions of an illuminating luminous flux in the short-side direction of a pixel can be used between a polarization transforming element and an electro-optic device.

Such a reducing optical system can be composed of a single concave lens, but taking account of reduction of its optical aberrations, it is preferable that the concave lens is composed of a combination lens obtained by combining a plurality of lenses. And in case of making small the sectional dimension of an illuminating luminous flux only in the short-side direction of a pixel, cylindrical lenses can be used as a convex lens and a concave lens. The same effect as the case (4) described above can be obtained also by using such a reducing optical system.

And in this case also, the sectional dimensions may be reduced not only in the short-side direction of a pixel but also in the long-side direction of a pixel. In such a case, a general curved lens being axially symmetric can be used as each of the concave and convex lenses.

(6) As a polarization transforming element, it is preferable to adopt a polarization transforming element which comprises a polarization separating film that transmits one of the two polarized luminous fluxes and reflecting the others, a reflecting film that reflects the other kind of polarized luminous fluxes, and a retardation plate (½-retardation plate or the like) that makes the two polarized luminous fluxes uniform in direction of polarization.

In a composition having such a polarization transforming element, in case that a first imaging optical system arranging the entrance end of a luminous flux separation optical element and a polarization transforming element in a conjugate relation to each other, and a second imaging optical system arranging the exit end of the luminous flux separation optical element and an electro-optic device in a conjugate relation to each other are formed, it is preferable that the conjugate ratio of the second imaging optical system is not less than 4.

The angular distribution of secondary light source images on the exit end of a luminous flux separation optical element is determined by the shape of a side face of the luminous flux separation optical element, for example, the shape of a tapered side face in case that the luminous flux separation optical element has a pair of tapered sides opposite to each other being made wider toward the light source, the F-number of the light source, the angular distribution specific to the light source and the like. And generally, the greater the conjugate ratio is, the more surely the parallelism of lights to be imaged on the electro-optic device can be obtained. The parallelism of the lights varies depending on the sub-pixel pitch of each color light on the electro-optic device, and it is preferable that the conjugate ratio for pixels having a fine pitch of about 10 $\mu$m is not less than 4, and a conjugate ratio of not less than 4 makes it possible to secure the parallelism among the respective color lights, prevent a color light from leaking to an adjacent pixel of another color light and thereby more surely prevent occurrence of mixture of colors in a projected image.

In case that such a second imaging optical system comprises a superposing lens to be disposed at the hind stage of a polarization transforming element and a parallelizing lens to be disposed at the fore stage of an electro-optic device, it is preferable that the color separation optical system is disposed between the superposing lens and the parallelizing lens.

By setting the conjugate ratio of the second imaging optical system as not less than 4, the parallelism among the respective color lights incident on the electro-optic device can be secured, and a certain degree of distance is formed between the superposing lens and the parallelizing lens. Accordingly, by disposing a color separation optical system provided with a plurality of mirrors at such a position and bending a luminous flux, it is possible to secure a necessary conjugate ratio even in a small space and make a projector smaller in size by disposing a color separation optical element without influencing another optical system.

(7) A projector according to the present invention may be a single-plate type projector comprising;

a light source, a color separation optical system that separates a luminous flux outputted from said light source into a plurality of color lights, said color separation optical system comprises a plurality of mirrors;

an electro-optic device that modulates respectively the color lights according to their image information to form an optical image, and a polarization transforming optical system provided at the fore stage of said color separation optical system, said polarization transforming optical system comprises a polarization separating film that transmits one of two polarized luminous fluxes and reflects the other, a reflecting film that reflects a polarized luminous flux reflected by said polarization separating film nearly in the same direction as said a single polarized luminous fluxes, and a retardation plate that makes said two polarized luminous fluxes uniform in direction of polarization, the direction in which said other polarized luminous flux is reflected by said polarization separating film is nearly perpendicular to the plane determined by the central axis of a luminous flux incident on said mirror and the central axis of the luminous flux reflected by said mirror.

According to the present invention as described above, since the direction in which the other luminous flux is reflected by a polarization separating film is nearly perpendicular to the plane determined by the central axis of a luminous flux incident on a mirror and the central axis of the luminous flux reflected by the mirror, a luminous flux outputted through the polarization transforming optical system diverges in the directions perpendicular to the direction of color separation of a plurality of color lights. Since the output luminous flux spreads in the long-side direction of a rectangle-shaped sub-pixel of each color light in an electro-optic device, it is possible to reduce leak of light to an adjacent sub-pixel of another color light and thereby prevent mixture of colors from occurring in a projected image.

In the present invention, a luminous flux separation optical element comprising a pole-shaped optical conductor for separating a luminous flux from a light source into a plurality of partial luminous fluxes may be disposed at the fore stage of said polarization transforming optical system.

Said optical conductor is preferably provided with tapered side faces whose dimensions in the direction perpendicular to the plane determined by the central axis of a luminous flux incident on said mirror and the central axis of the luminous flux reflected by said mirror are made gradually wider from the exit end of said optical conductor toward the entrance end.

Each time a luminous flux which has entered an optical conductor from the entrance end of it repeats an internal reflection from such tapered side faces, the angles of incidence and reflection of the luminous flux at the tapered side faces become smaller. Accordingly, when tapered side faces in which the dimensions in the direction perpendicular to the plane determined by the central axes of incident and reflected luminous fluxes on and from a mirror forming a color separation optical system are made gradually wider from the exit end toward the entrance end are adopted, since the intervals between the tertiary light source images become larger, a luminous flux utilizable after polarization transformation is increased and therefore the efficiency of polarization transformation by a polarization transforming optical system is improved.

And it is preferable that a reflecting mirror that reflects and supplies an output luminous flux from said light source to the entrance end of said optical conductor is provided between said light source and said optical conductor. Here, it is preferable that the direction of incidence of a luminous flux incident on said reflecting mirror is made nearly parallel with the output direction of the luminous fluxes outputted from a plurality of mirrors forming a color separation optical system.

In case of supplying a luminous flux outputted from a light source to the entrance end of an optical conductor, the light of a lamp or the like is condensed on the entrance end of the optical conductor by means of a reflector, a lens and the like. Therefore, since said reflecting mirror can be made small by disposing a reflecting mirror midway in the course of condensation of an output luminous flux from a light source in such a manner, a projector can be made small in size. And since the optical path of an output luminous flux from a light source to a projection optical system can be made U-shaped by making the direction of incidence of a luminous flux incident on a reflecting mirror nearly parallel with the output direction of luminous fluxes from a plurality of mirrors forming a color separation optical system, a projector can be more advantageously made smaller in size.

And the other polarized luminous flux described above is preferably an s-polarized luminous flux to a polarization separating film, and this s-polarized luminous flux is preferably transformed into a p-polarized luminous flux by said retardation plate.

Since an s-polarized luminous flux is transformed into a p-polarized luminous flux by a polarization transforming optical system and thereby a luminous flux is incident on mirrors forming a color separation optical system disposed at the hind stage of the polarization transforming optical system as an s-polarized luminous flux, the efficiency of reflection of the mirrors is improved. It is possible to provide a projector having a high efficiency of utilization of light outputted from a light source system.

Further, it is conceivable that a polarization transforming optical system is provided with a plurality of polarization separating films arranged so that their reflecting faces are parallel to each other or arranged according to the state of divergence of an incident luminous flux.

In case of a polarization transforming optical system in which polarization separating films are arranged to be parallel to another, since its structure is simplified, it is possible to make it easy to manufacture such a polarization transforming optical system. And when the polarization separating films are arranged according to the state of divergence of an incident luminous flux, since a polarization separation and transformation can be efficiently performed according to a divergent luminous flux outputted from the exit end of an optical conductor, the polarization separation characteristic is improved.

BRIEF DESCRIPTION OF THE DRAWINGS

FIG. 3(a) is a vertical sectional view of it and FIG. 3(b) is a perspective view of its appearance.

FIG. 11(a) is a plan view and FIG. 11(b) is a vertical sectional view.

FIG. 13(a) is a plan view and FIG. 13(b) is a vertical sectional view.

DETAILED DESCRIPTION OF THE PREFERRED EMBODIMENTS

Next, embodiments of the present invention are described with reference to the drawings.

[1] First Embodiment

Figure 1:
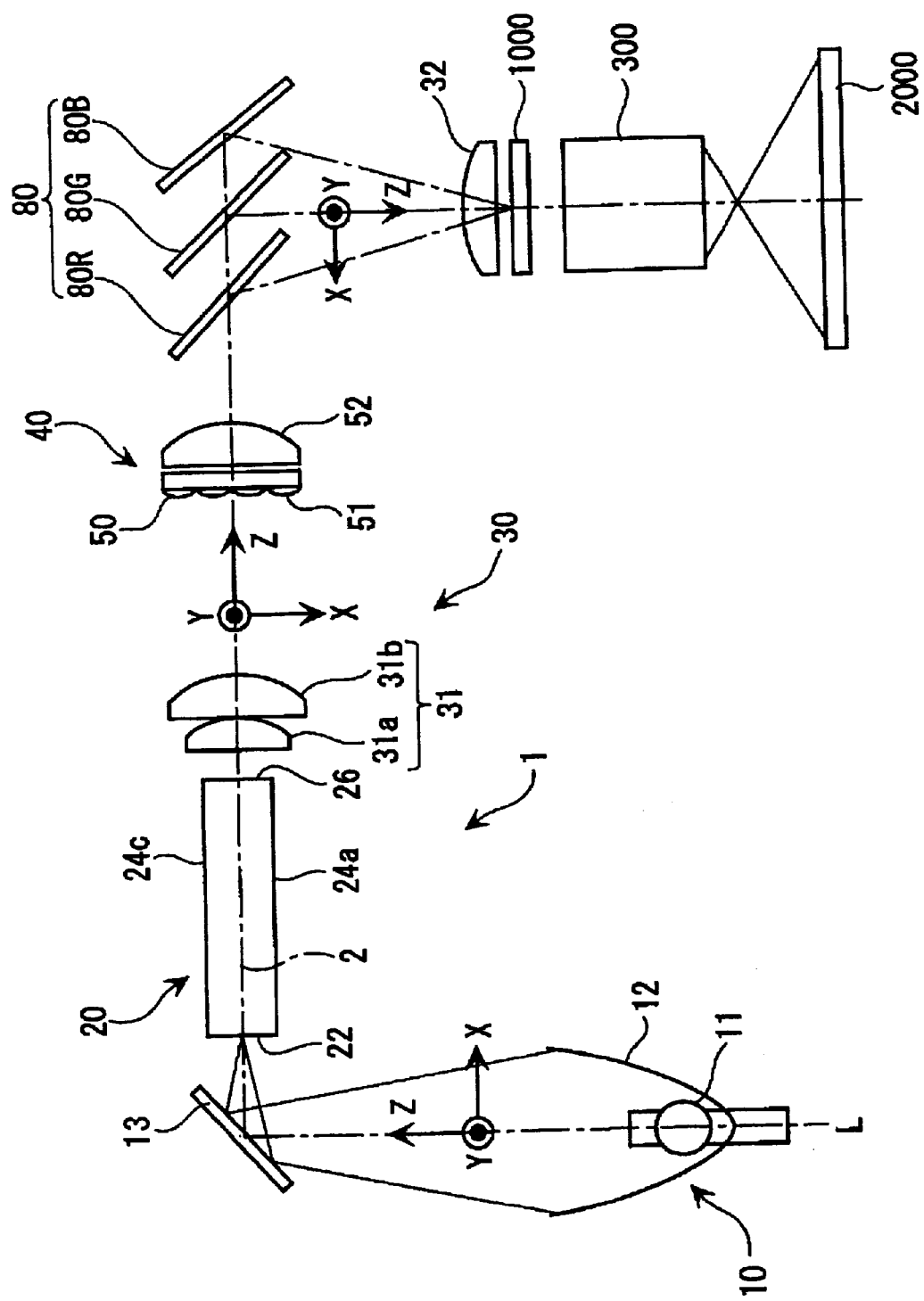
FIG. 1 is a plan view showing the structure of a projector according to a first embodiment of the present invention.

FIG. 1 shows a schematic view showing the structure of a projector according to a first embodiment of the present invention. This projector comprises a light source lamp 10, a rod 20 (pole-shaped optical conductor) as a luminous flux separation optical element, a relay optical system 30, a polarization transforming element 40, a color separation optical element 80, a liquid crystal device 1000 being an electro-optic device of a spatial color separation type and a projection lens 300 to be a projection optical system, and they are arranged along a virtual illumination optical axis L. And the light source lamp 10, the rod 20, the relay optical system 30 and the polarization transforming element 40 form an illuminator 1 in this embodiment A luminous flux outputted from the light source lamp 10 is separated into a plurality of partial luminous fluxes by the rod 20, transformed into nearly a single polarized light by the polarization transforming element 40, and then separated into a plurality of color lights by the color separation optical element 80, and given an optical modulation according to image information for each color, and an optical image after modulation is magnified and projected by the projection lens 300 on a projection face 2000 such a screen or the like.

In this embodiment and all the following embodiments, the Z-axis direction is the progressing direction of an incident luminous flux 2, the X-axis direction is the 3-o'clock direction facing the progressing direction of an incident luminous flux 2 and the Y-axis direction is the 12-o'clock direction facing the progressing direction of an incident luminous flux 2 (the direction perpendicular to the page face of FIG. 1), where the illumination optical axis L is nearly parallel with the Z-axis.

[1-1] Light source lamp

The light source lamp 10 is composed of a metal-halide lamp, a high-pressure mercury-vapor lamp or the like, and is provided with a light source 11 for radially emitting light and an elliptical reflector 12 for collecting light emitted from the light source 11, which is arranged so that one of the two focuses of the elliptical reflector 12 is positioned at or near the light source 11 and the other is positioned at or near the entrance end 22 of the rod 20. A luminous flux emitted from the light source 11 is bent by an angle of 90 degrees by a mirror 13 and condensed near the entrance end 22 of the rod 20 by the elliptical reflector 12 and then enters the rod 20 in a condensed state. A parabolic reflector or a spherical reflector can be used in place of the elliptical reflector 12. In such a case, however, a condenser element (for example, a condenser lens) for condensing nearly parallel luminous fluxes emitted from the reflector to the entrance end 22 of the rod 20 needs to be provided at the exit side of the reflector.

[1-2] Luminous flux separation optical element

The rod 20 as a luminous flux separation optical element is a member for separating a luminous flux from the light source lamp 10 into a plurality of partial luminous fluxes and thereby forming a plurality of light source images being located nearly in the shape of a matrix in an X-Y plane.

This rod 20 is a pole-shaped solid rod formed out of a transparent, optically conductive material, for example, a glass material, and is of a hexahedron having an entrance end 22 through which a luminous flux is entered, four reflecting faces 24a, 24b, 24c and 24d for reflecting and propagating the luminous flux, and an exit end 26 through which the propagated luminous flux is outputted. In this case, a total reflection with no optical loss occurs on the four reflecting faces 24a, 24b, 24c and 24d, and since light is propagated utilizing the total reflection, the rod 20 can attain a high optical propagation efficiency.

Hereupon, the rod 20 is of a rectangular parallelepipedon in which the shape of the exit end 26 in an X-Y plane is nearly similar to the shape (a square in this embodiment) of a display area of the liquid crystal device 1000 being an area to be illuminated. Accordingly, the shapes of the entrance end 22 and the exit end 26 are equal to each other, the reflecting faces 24a and 24c are parallel with each other, and the reflecting faces 24b and 24d are parallel with each other. A luminous flux incident on this rod 20 is separated into a plurality of partial luminous fluxes being different in the exit angle from the exit end 26 according to the position and the number of reflections at the reflecting faces 24a, 24b, 24c and 24d.

The plurality of partial luminous fluxes emitted at different angles from the rod 20 are condensed by a condenser lens 31 and form a plurality of light source images S nearly in the shape of a matrix in an X-Y plane which is nearly parallel with the exit end 26 and nearly perpendicular to the illumination optical axis L at a specific distance from the rod 20. Hereupon, the X-Y plane in which the plurality of light source images S are formed is referred to as a virtual plane P (see FIG. 2).

As shown in FIG. 1, a first transfer lens 50, a polarization transforming element 40 and a second transfer lens 52 are arranged on or near the virtual plane P in which the plurality of light source images S are formed.

[1-3] Polarization transforming element

Figure 3A:
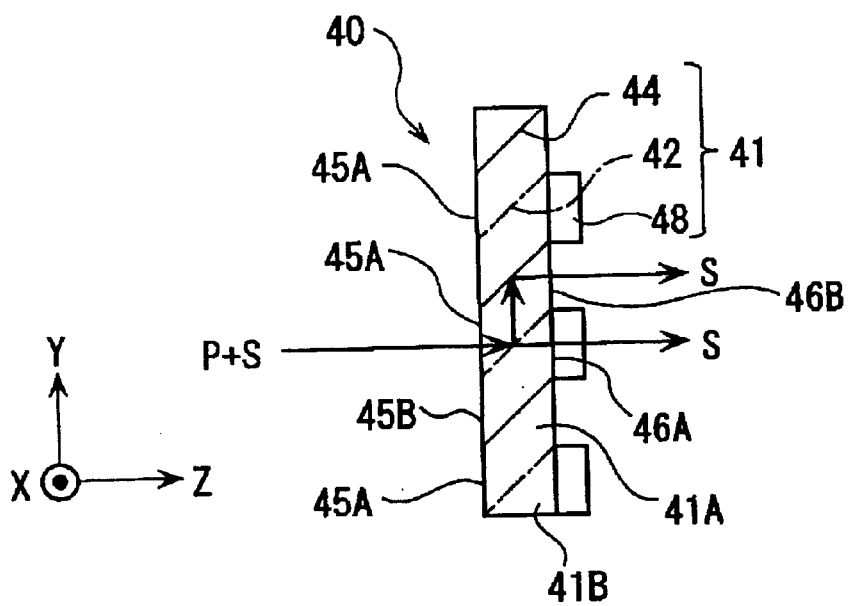
FIGS. 3(a) and 3(b) show the composition of a polarization transforming element in an embodiment of the present invention.
Figure 3B:
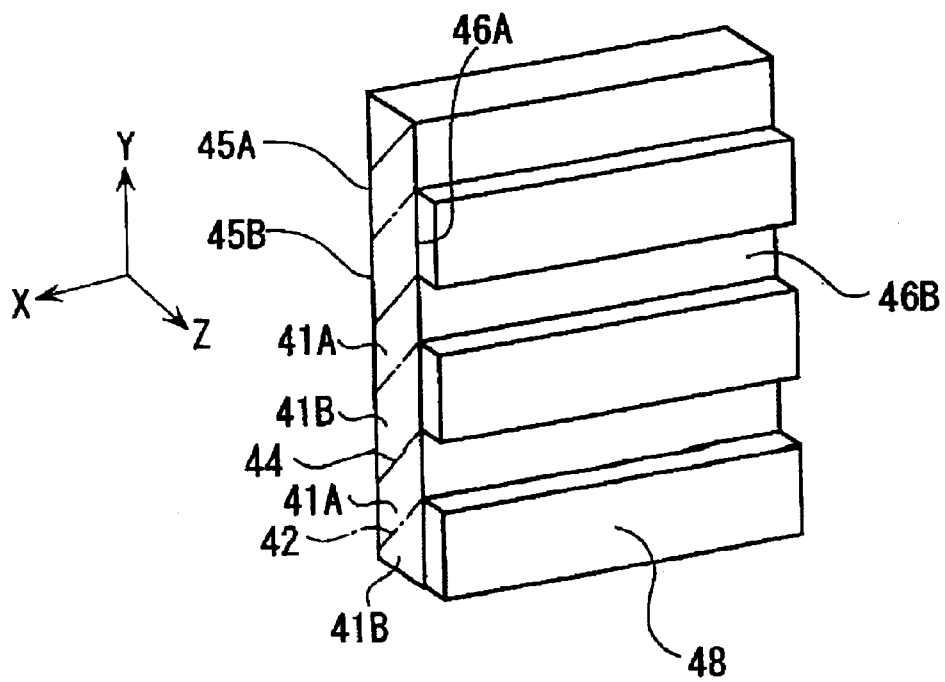

The polarization transforming element 40 has a function of transforming an incident luminous flux into a specific linearly polarized luminous flux, and FIG. 3 is an explanatory view showing the structure of it. FIG. 3(*a*) is a vertical sectional view seen from the X-axis direction and FIG. 3(*b*) is a perspective view of its appearance.

The polarization transforming element 40 is composed of a plurality of transparent members 41A and 41B, a plurality of polarization separating films 42 and reflecting films 44 disposed alternately between these transparent members, and retardation plates 48 that rotates the direction of polarization provided at positions corresponding to the polarization separating films 42. And the polarization transforming element 40 is formed by adhering alternately the transparent members 41A having the polarization separating films 42 and the reflecting films 44 formed on them and the transparent members 41B having no polarization separating films 42 nor the reflecting films 44 formed on them with an adhesive agent, and then adhering the retardation plates 48 onto the transparent members 41B. As described later, the Y-axis direction of this corresponds to the long-side direction of a pixel forming the liquid crystal device 1000, and the X-axis direction of this corresponds to the short-side direction of a pixel. All the polarization separating films 42 and the reflecting films 44 do not need to be arranged in the same direction, but taking one polarization separating film 42 and one reflecting film 44 as a constituent unit (referred to as a polarization transforming portion 41), for example, the constituent units may be arranged so that the directions of their film faces are alternately different from each other with respect to an X-Z plane being taken as a plane of symmetry. And in this embodiment, the polarization separating films 42 and the reflecting films 44 are all arranged at the same intervals, but they may be arranged at different intervals.

Hereupon, for convenience, in the entrance face of the polarization transforming element 40 through which a luminous flux is entered, a face directly corresponding to a polarization separating film 42 is called an "entrance face 45A" and a face directly corresponding to a reflecting film 44 is called an "entrance face 45B", and in the same way in the entrance face through which a luminous flux is outputted, a face directly corresponding to a polarization separating film 42 is called an "exit face 46A" and a face directly corresponding to a reflecting film 44 is called an "exit face 46B". As shown in FIGS. 3(*a*) and 3(*b*), a plurality of entrance faces 45A and entrance faces 45B are formed alternately at specific intervals along the direction of polarization separation in the polarization separating films 42, namely, along the Y-axis direction. In the same way, a plurality of exit faces 46A and exit faces 46B are also formed alternately at specific intervals along the Y-axis direction.

The polarization separating film 42 has a function of spatially separating an incident non-polarized luminous flux having a random polarization directions into two linearly polarized luminous fluxes being nearly perpendicular to each other in direction of polarization. That is, a luminous flux incident on the polarization separating film 42 is separated into a first linearly polarized luminous flux being a transmitted light which passes through the polarization separating film 42 and a second linearly polarized luminous flux being a reflected light which is reflected by the polarization separating film 42 and is bent by about 90 degrees in its progressing direction. In this embodiment, the first linearly polarized luminous flux is defined as a p-polarized luminous flux and the second linearly polarized luminous flux is defined as an s-polarized luminous flux, and the polarization separating film 42 is formed so as to have such a characteristic and an angle that a luminous flux is reflected substantially in parallel with the Y-axis direction. Concretely, the polarization separating film 42 is inclined at an angle of about 45 degrees with the virtual plane P in which the plurality of light source images S are formed. This polarization separating film 42 can be implemented by a dielectric multilayered film.

The reflecting film 44 has a function of reflecting again a reflected light from the polarization separating film 42 and directing its progressing direction substantially in the same direction as the progressing direction of a transmitted light. The reflecting film 44 can realize this function by means of a dielectric multilayered film, an aluminum film or the like formed on a transparent member, and is arranged substantially in parallel with the polarization separating film 42.

The retardation plate 48 has a function of making the direction of polarization of one polarized luminous flux out of a transmitted light and a reflected light coincide substantially with the direction of polarization of the other polarized luminous flux. In this embodiment, a ½-retardation plate is used as the retardation plate 48, and it is provided selectively only on the exit faces 46A so as to avoid the exit faces 46B. Accordingly, only the direction of polarization of a light which has passed through the polarization separating film 42 is turned by about 90 degrees, and as a result, almost all luminous fluxes outputted from the polarization transforming element 40 are formed into a single luminous fluxes. In this embodiment, almost all lights outputted from the polarization separating element 40 are made into an s-polarized luminous flux.

So long as two polarized luminous fluxes separated by the polarization transforming element 40 can be unified into a single polarized luminous fluxes having the same direction of polarization, the kind and the position of a retardation plate are not limited. For example, it is possible also to adopt a composition in which retardation plates being different in phase difference respectively on the exit faces 46A and 46B are disposed and thereby the directions of polarization of polarized luminous fluxes which have passed through the respective retardation plates are made uniform.

By using such a polarization separation transforming element 40, it is possible to efficiently transform non-polarized luminous fluxes emitted from the light source lamp 10 into a single polarized luminous fluxes. Accordingly, it is possible to improve the efficiency of utilizing light in a liquid crystal device 1000 capable of using only a single polarized luminous fluxes.

[1-4] Relay optical system

The relay optical system 30 is a transfer optical system that transfers an image formed on the exit end 26 of the rod 20 to the liquid crystal device 1000 being an area to be illuminated. In this embodiment, the relay optical system 30 is composed of a condenser lens 31, a first transfer lens 50, a second transfer lens 52 and a parallelizing lens 32.

The condenser lens 31 is disposed near the exit end 26 of the rod 20, and has a function of introducing a partial luminous flux from the rod 20 into the polarization transforming element 40 through the first transfer lens 50. The condenser lens 31 of this embodiment is composed of a combination lens obtained by combining two condenser lenses 31a and 31b but is not limited to this and may use a general single lens. However, in order to reduce optical aberrations liable to appear in introducing a partial luminous flux into the polarization transforming element 40, it is suitable to use a combination lens or an aspheric lens.

The first transfer lens 50 is a lens array obtained by combining a plurality of rectangular microlenses 51 substantially in the shape of a matrix, and has a function of efficiently introducing each of a plurality of partial luminous fluxes to an entrance face 45A (see FIG. 3) of the polarization transforming element 40. The number of microlenses 51 and the arrangement of them are determined correspondingly to the number of light source images formed by the rod 20 and the positions of them. The shape of microlenses 51 forming the first transfer lens 50 is not limited, but the first transfer lens 51 formed into the shape of a plate by flatly arranging a plurality of rectangular microlenses 51 as shown in this embodiment is easy to use. And since the condensing characteristic of each microlens 51 can be optimized by using a plurality of microlens 51, optical aberrations liable to appear when transferring a luminous flux can be effectively reduced. However, according to the properties of a luminous flux emitted from the rod 20 (in case that an angle of emission is small, for example), the first transfer lens may use a single lens in place of a plurality of microlenses 51 and further may be omitted.

The second transfer lens 52 is disposed at the exit side of the polarization transforming element 40, and has a function of transferring a plurality of partial luminous fluxes outputted from the polarization transforming element 40 to the liquid crystal device 1000 being an area to be illuminated and superposing these partial luminous fluxes on a display area of the liquid crystal device 1000 being a single area to be illuminated. The second transfer lens 52 of this embodiment is composed of a single lens, but may be formed as a lens array composed of a plurality of lenses in a similar manner to the first transfer lens 50.

Although in this embodiment the first transfer lens 50 is disposed at the entrance side of the polarization transforming element 40 and the second transfer lens 52 is disposed at the exit side of the polarization transforming element 40, these transfer lenses both may be disposed together at the entrance side or the exit side, and in such a case, one lens integrating the two transfer lenses 50 and 52 in function may be used. In this case it is possible to make an illuminator lower in cost. And in this embodiment, since the first transfer lens 50 is disposed at the entrance side of the polarization transforming element 40, this is made to have a function of efficiently introducing each of a plurality of partial luminous fluxes into an entrance face 45A (see FIG. 3) of the polarization transforming element 40, and since the second transfer lens 52 is disposed at the exit side of the polarization transforming element 40, this is made to have a function of superposing a plurality of partial luminous fluxes on the liquid crystal device 1000. However, the functions which the transfer lenses 50 and 52 are made to have may be properly changed according to the positions at which the respective transfer lenses are located.

The parallelizing lens 32 is disposed at the entrance side of the liquid crystal device 1000 being an area to be illuminated, and has a function of transforming a plurality of partial luminous fluxes which enter the liquid crystal device 1000 from the polarization transforming element 40 through the second transfer lens 52 into luminous fluxes each being in parallel with its central axis and efficiently introducing them into the liquid crystal device 1000. Since a color separation optical element 80 described later has dependence upon an angle of incidence in its color separation characteristic, it is liable to generate irregularity in color. Therefore, making much account of preventing a color irregularity from occurring in the color separation optical element 80, the parallelizing lens 32 may be disposed at the entrance side of the color separation optical element 80.

Since such a relay optical system 130 is arranged, an image formed on the exit end 26 of the rod 20 is magnified or reduced and transferred onto the liquid crystal device 1000 being an area to be illuminated.

[1-5] Color separation optical element

Figure 4:
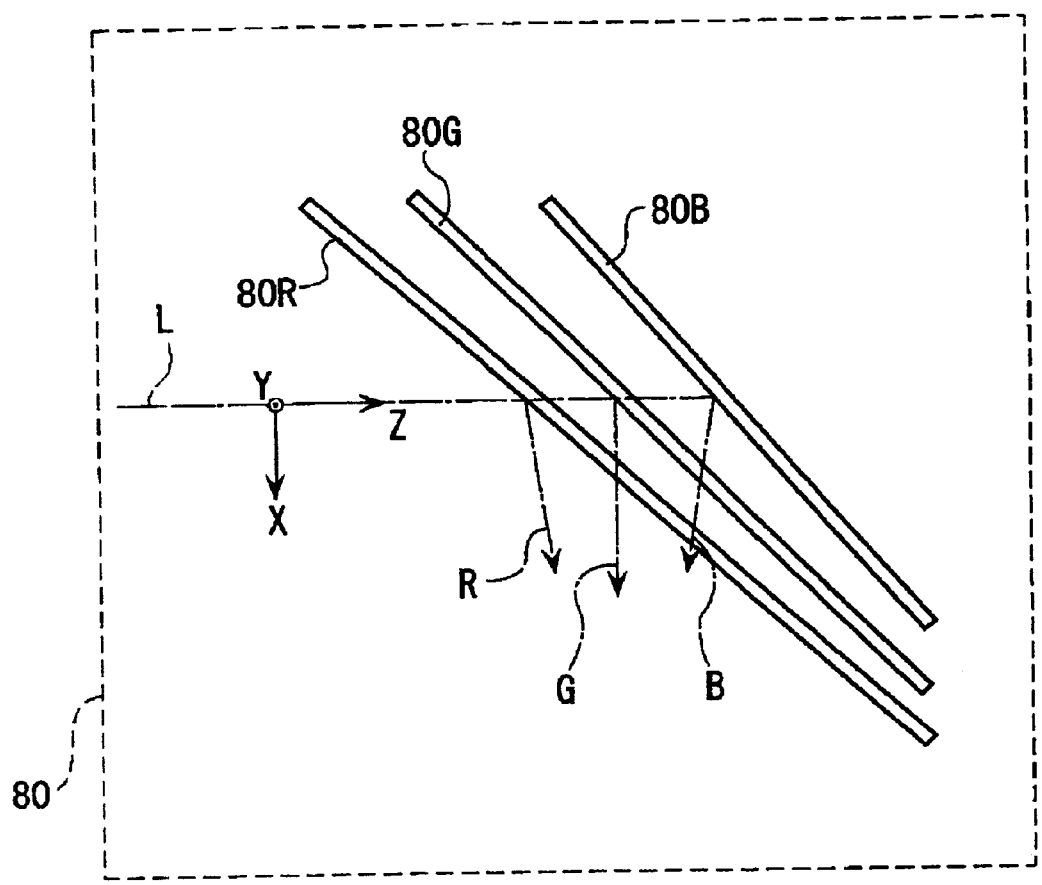
FIG. 4 is a plan view showing the structure of a color separating optical element in an embodiment of the present invention.

The color separation optical element 80 is an optical element which selectively reflects or transmits a red light R, a green light G and a blue light B as shown in FIG. 4, and is provided with three dichroic mirrors 80R, 80G and 80B respectively having wavelength selecting films different from one another formed on them. The dichroic mirror 80R is a mirror which reflects a red light R and transmits a green light G and a blue light B. And the dichroic mirror 80G is a mirror which separates from each other a green light G and a blue light which have passes through the dichroic mirror 80R, and reflects a green light G and transmits a blue light B. Further, the dichroic mirror 80B is a mirror which reflects a blue light B which has passed through the dichroic mirror 80G. Since only a blue light B reaches this dichroic mirror 80B, an ordinary total reflection mirror may be adopted in place of the dichroic mirror 80B.

These three dichroic mirrors 80R, 80G and 80B are arranged so that a luminous flux emitted from the illuminator 1 is incident on the mirror faces at angles different from one another, and a red light R, a green light G and a blue light B respectively reflected by the dichroic mirrors 80R, 80G and 80B are branched and emitted in three directions in a Z-X plane. In other words, the directions in which a luminous flux which has passed through the rod 20 of the illuminator 1 is separated into color lights of red, green and blue by the color separation optical element 80 are nearly parallel with the Z-X plane.

[1-6] Electro-optic device

Figure 5:
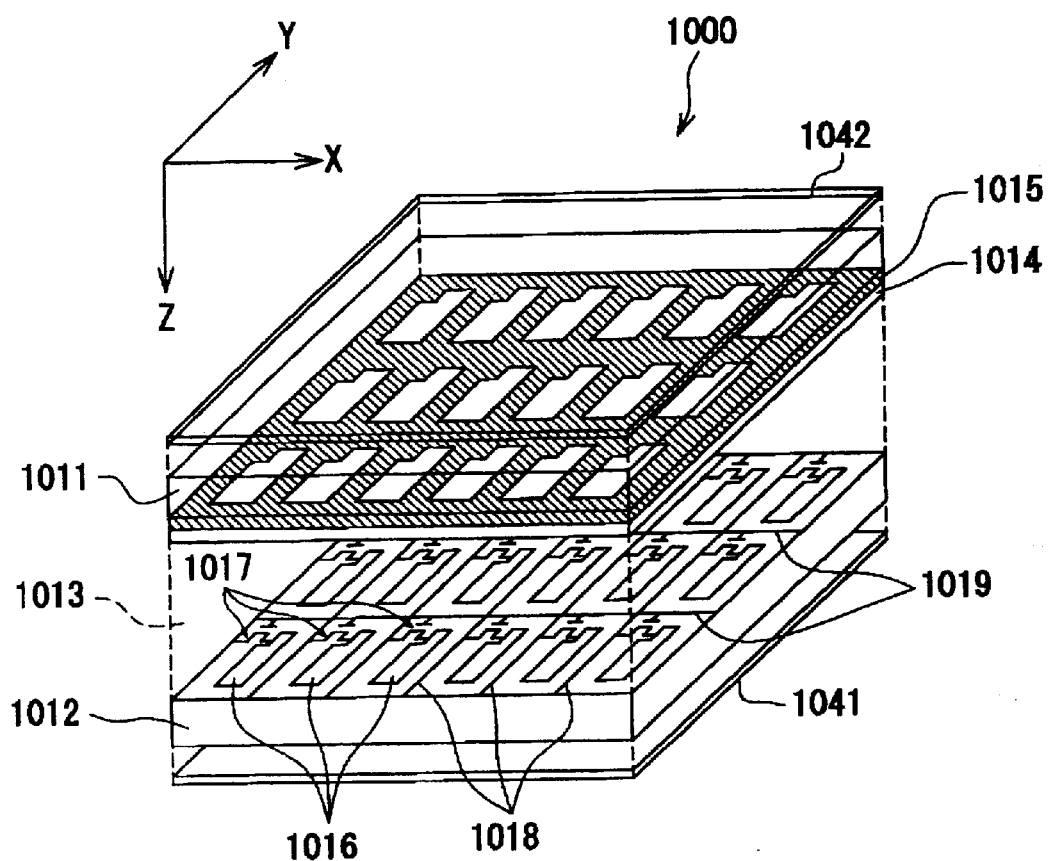
FIG. 5 is an exploded perspective view showing the structure of a liquid crystal device in an embodiment of the present invention.
Figure 6A:
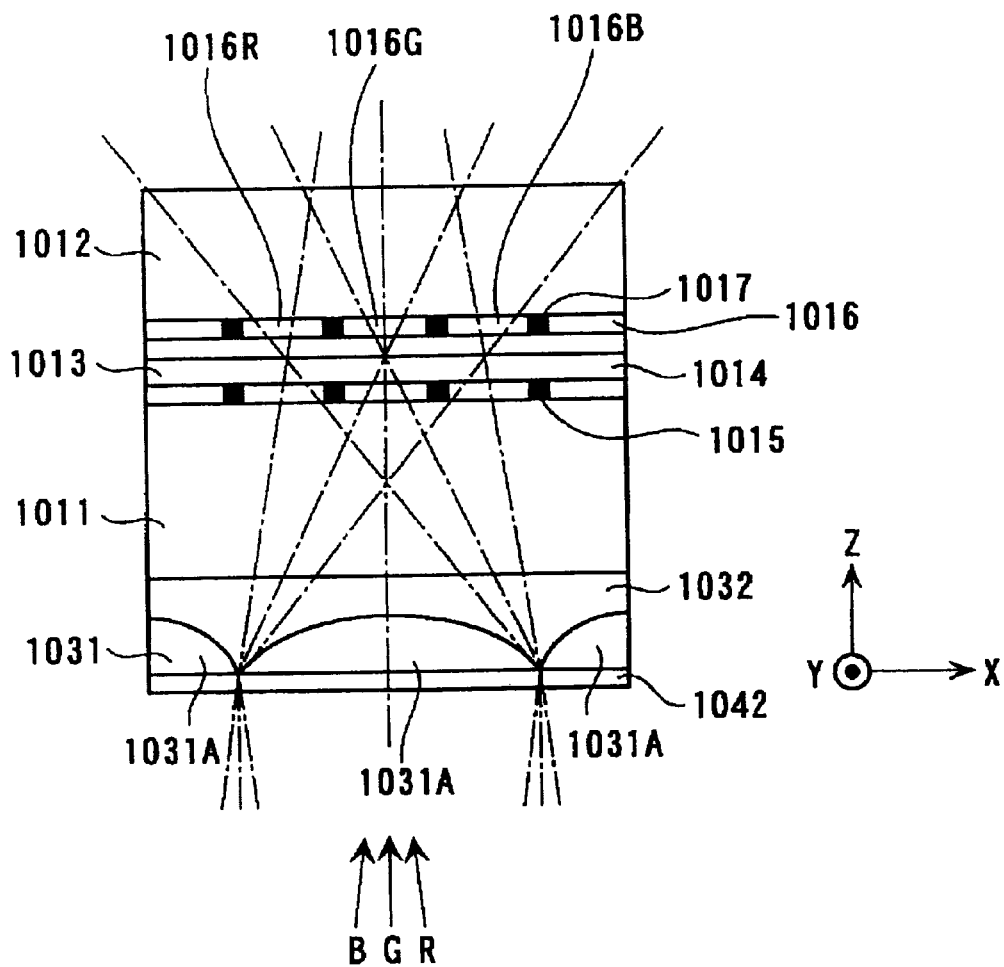
FIG. 6 shows a horizontal sectional view showing the structure of a liquid crystal device and a front view showing the shape of a pixel in an embodiment of the present invention.
Figure 6B:
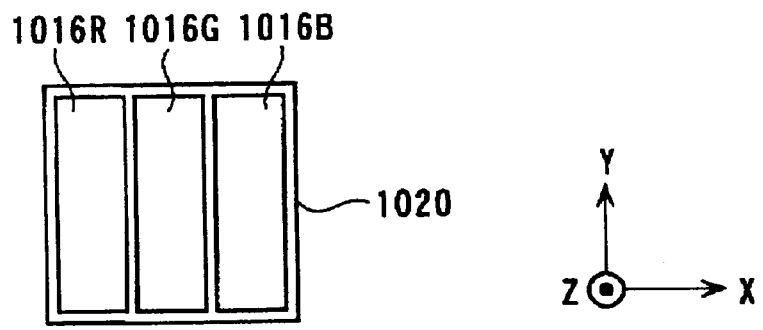

A liquid crystal device 1000 of a spatial color separation type to be an electro-optic device is a liquid crystal device 1000 of a transmission type which optically modulates an incident luminous flux and emits the modulated luminous flux from the opposite side to the entrance side. As shown in FIGS. 5 and 6, this liquid crystal device 1000 has a twisted-nematic (TN) liquid crystal 1013 sealed in between two transparent substrates 1011 and 1012 of glass or the like. One substrate 1011 has a common electrode 1014, a shielding portion 1015 for shading unnecessary lights, and the like formed on it, and the other substrate 1012 has sub-pixel electrodes 1016, thin-film transistors (TFTs) 1017 as switching elements, and the like formed on it, and when a voltage is applied to a sub-pixel electrode 1016 through a TFT 1017, a liquid crystal 1013 interposed between the sub-pixel electrode 1016 and the common electrode 1013 is driven. On the other substrate 1012, a plurality of scanning lines 1018 and a plurality of data lines 1019 are arranged crossing each other, and a TFT 1017 having its gate, source and drain respectively connected to a scanning line 1018, data line 1019 and sub-pixel electrode 1016 is arranged near each of the crossing points. The sub-pixel electrode 1016 is disposed at an opening of the liquid crystal device 1000, namely, at an area corresponding to an area not shielded by the shielding portion 1015, and each sub-pixel is formed by a TFT 1017 and a sub-pixel electrode 1016. The short-side direction of a sub-pixel electrode 1016 nearly coincides with a direction in which a luminous flux is separated by the color separation optical element 80, and the pitch in the short-side direction (X-axis direction in FIG. 5) of the sub-pixel electrodes 1016 is set as ⅓ of the pitch in the long-side direction (Y-axis direction in FIG. 5).

And as shown in FIG. 6, at the light entrance side of one substrate 1011 there is provided a microlens array 1031 for condensing respectively color lights R, G and B separated by the color separation optical element 80 onto the corresponding sub-pixel electrodes 1016R, 1016G and 1016B of the liquid crystal device 1000. The microlens array 1031 is provided with a plurality of unit microlenses 1031A formed into the shape of a matrix, mosaic or the like, in which one unit microlens 1031A corresponds to three sub-pixels (sub-pixel electrodes) arranged side by side in the X-axis direction correspondingly to the respective color lights. The microlens 1031A is formed on a glass plate by etching or the like, and is adhered to the substrate 1011 through a resin layer (adhesive agent) 1032 having a low refractive index. And as shown in FIG. 5 also, polarizing plates 1041 and 1042 are provided respectively at the light exit side of the substrate 1012 and the light entrance side of the microlens array 1031.

As shown in FIG. 6, a red light R, a green light G and a blue light B which are reflected by the dichroic mirrors 80R, 80G and 80B and outputted at different angles from the color separation optical element 80 are incident on a unit microlens 1031A of the microlens array 1031 at different angles. The respective color lights incident on a unit microlens 1031A are condensed near three sub-pixel electrodes 1016 corresponding to the unit microlens 1031A. Accordingly, lights which have entered the liquid crystal device 1000 are spatially separated according to the kinds of their respective color lights and the separated color lights enter selectively the corresponding different sub-pixels and then are optically modulated independently of one another for each color, and therefore a color image can be formed by a single plate of liquid crystal device. The unit microlens 1031A is set so that it has an optical characteristic (focal length) for condensing the respective color lights onto the three sub-pixels corresponding to this lens 1031A.

As shown in FIG. 6(*a*), since a sub-pixel electrode 1016G corresponding to a green light G is located nearly on the central axis of a unit microlens 1031A in a X-Z plane, a green light G condensed by the unit microlens 1031A passes through the sub-pixel electrode 1016G nearly perpendicularly to it. On the other hand, since a sub-pixel electrode 1016R corresponding to a red light R and a sub-pixel electrode 1016B corresponding to a blue light B are located offset from the central axis of the unit microlens 1031A, the red light R and the blue light B condensed by the unit microlens 1031A pass through the sub-pixel electrode 1016R and 1016B in slant directions. When the order of color separations by the dichroic mirrors 80R, 80G and 80B is changed, the positions of incidence of the respective color lights onto the liquid crystal device 1000 shown in FIG. 6 are changed according to the changed order.

In such a liquid crystal device 1000, as shown in FIG. 6(*b*), three sub-pixel electrodes 1016R, 1016G and 1016B arranged adjacently to one another in the X-axis direction form a single square-shaped color pixel 1020 to form a color image. Therefore, each of the sub-pixel electrodes 1016R, 1016G and 1016B is made into the shape of a rectangle obtained by dividing a square along the X-axis direction, namely, a rectangle whose short sides are in the X-axis direction and whose long sides are in the Y-axis direction. Accordingly, it can be said that a color mixture (leak of light to an adjacent sub-pixel) is more liable to be generated by a luminous flux having a larger angular distribution in the X-axis direction, said luminous flux entering sub-pixel electrodes 1016R, 1016G and 1016B having such a shape, than a luminous flux having a larger angular distribution in the Y-axis direction.

[1-7] Relation between the direction of polarization separation and the shape of a sub-pixel electrode 1016

Figure 2:
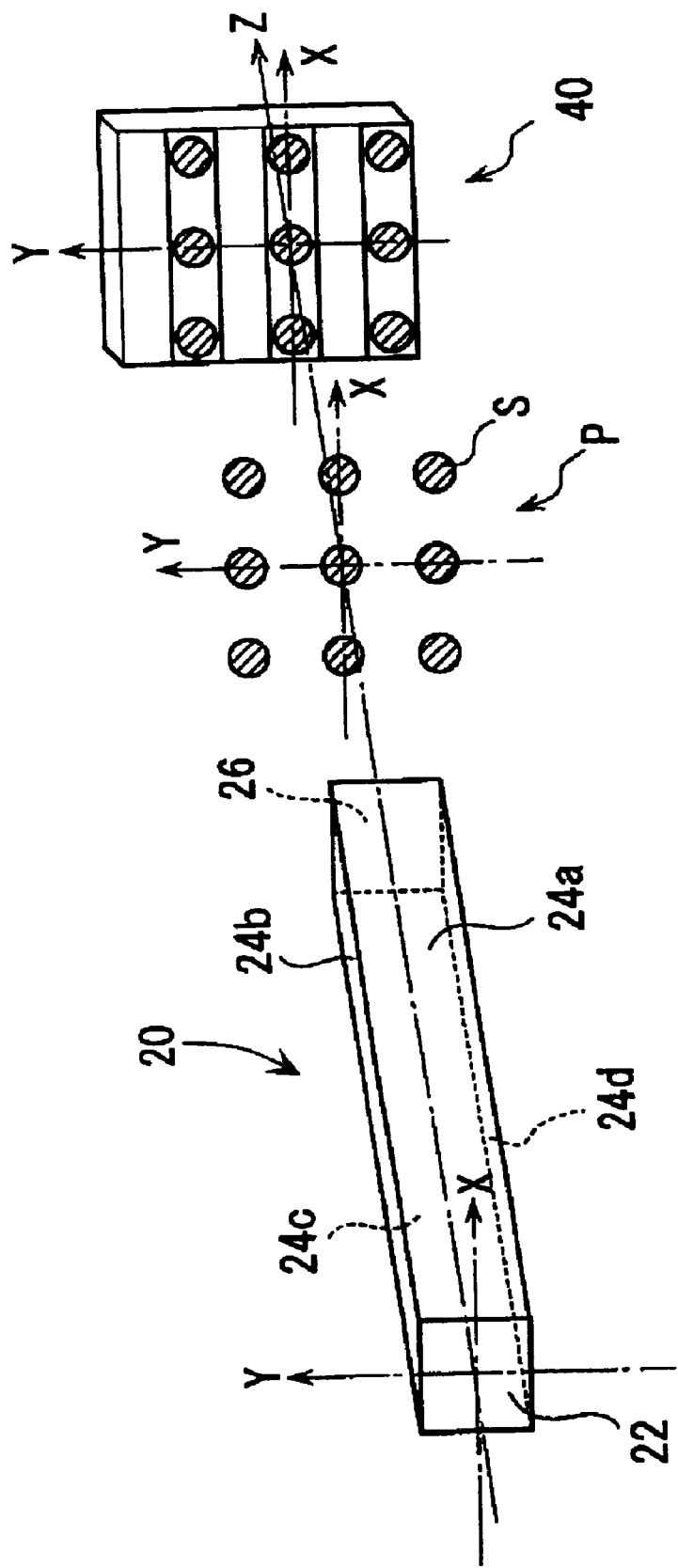
FIG. 2 is a schematic perspective view showing the relation between a rod and the position of formation of light source images in the first embodiment.

Thereupon, as shown in FIGS. 2 and 3, a projector of this embodiment prevents the angular distribution of a luminous flux incident on a sub-pixel electrode from expanding in the X-axis direction by making the direction of polarization separation by the polarization transforming element 40 parallel with the Y-axis direction being the long-side direction of the sub-pixel electrodes 1016R, 1016G and 1016B. That is to say, although it is not possible to avoid some expansion of the angular distribution of an illuminating luminous flux in the process of polarization separation by the polarization transforming element 40, it is possible to prevent the angular distribution of an illuminating luminous flux from expanding in the short-side direction (X-axis direction) in which a color mixture is more liable to occur by making this expansion occur in the long-side direction (Y-axis direction) in which a color mixture is not liable to occur in the sub-pixel electrodes. Thus, it is possible to reduce a color mixture caused by leak of light to an adjacent sub-pixel and realize a projected image being high in contrast and excellent in color reproducibility.

[2] Second Embodiment

Next, a second embodiment of the present invention is described.

The interval between light source images formed on a virtual plane P can be optionally controlled by adjusting the inclination of a reflecting face of a rod or the interval between a pair of reflecting faces facing each other. The interval between light source images can be made wider by making gradually smaller the interval between the reflecting faces from the entrance end of the rod toward the exit end. Hereinafter, a state where the interval between the reflecting faces is made more narrow from the entrance end toward the exit end of the rod is referred to as a "tapered state". Inversely, the interval between light source images can be made smaller by making gradually wider from the entrance end of the rod toward the exit end. Hereinafter, a state where the interval between the reflecting faces is made gradually wider from the entrance end toward the exit end of the rod is referred to as an "inversely tapered state".

This embodiment is an embodiment in which the reflecting faces of a rod facing each other in the X-axis direction are in an inversely tapered state, and is the same as a projector of the first embodiment except the shape of the rod. Therefore, the description of parts other than the rod is omitted. And it is possible also to apply variants of the components described in the first embodiment to this embodiment.

Figure 7:
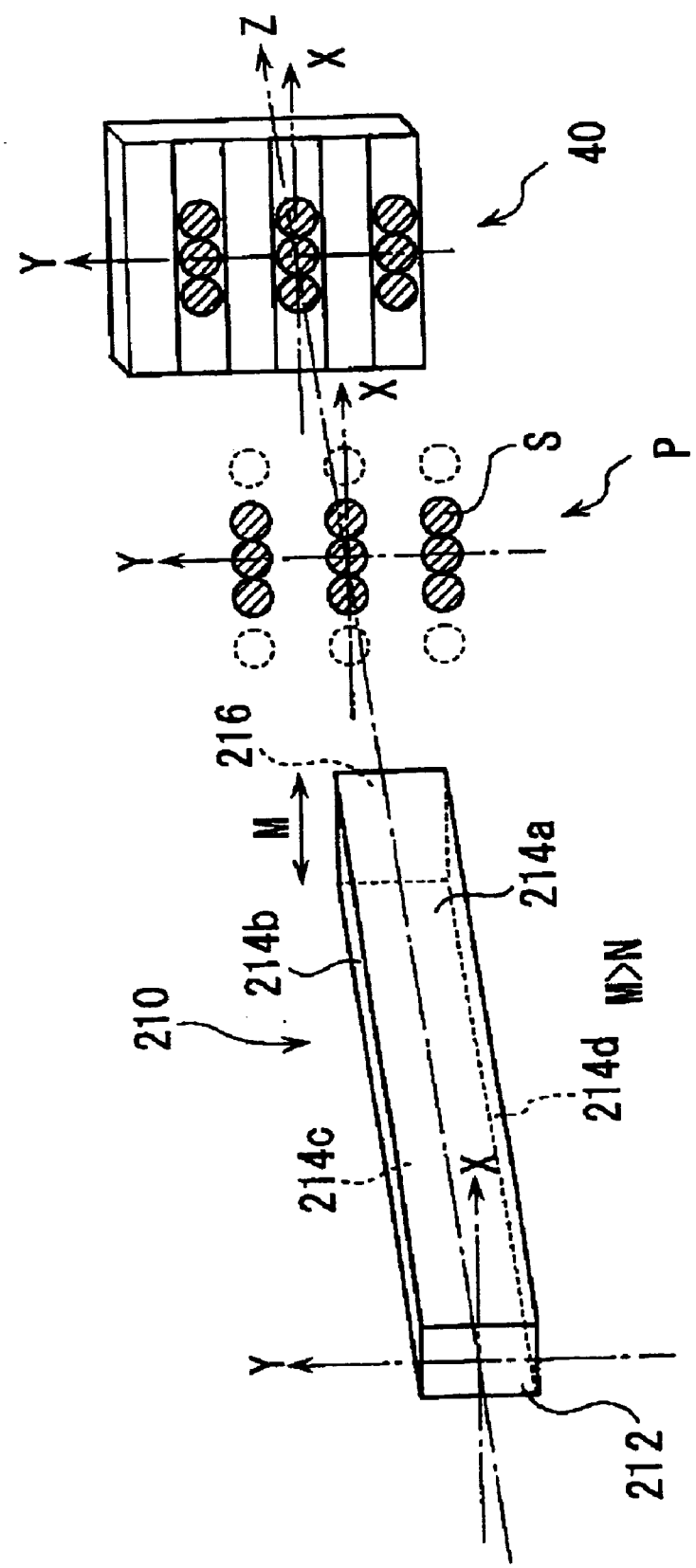
FIG. 7 is a schematic perspective view showing the relation between a rod and the position of formation of light source images in a second embodiment of the present invention.

FIG. 7 is a schematic perspective view showing the relation between a rod 210 and the position where light source images S are formed. Either of the sectional shapes of the entrance end 212 and the exit end 216 of the rod 210 is rectangular in an X-Y plane. In case of this embodiment, the shape of the exit end 216 is made substantially similar to the shape of a liquid crystal device being an area to be illuminated. A pair of reflecting faces 214*a* and 214*c* facing each other in the X-axis direction are in an inversely tapered state.

A pair of reflecting faces 214*b* and 214*d* facing each other in the Y-axis direction are parallel with each other. Due to this, in comparison with the rod 20 in the first embodiment, the intervals between a plurality of light source images S are made more narrow in the X-axis direction in which the pair of reflecting faces 214*a* and 214*c* being in an inversely tapered state face each other.

Therefore, this embodiment can further reduce the expansion of angles of incidence in the X-axis direction and can more reduce a color mixture caused by leak of light to an adjacent sub-pixel. Thus, it is possible to realize a projected image being very high in contrast and excellent in color reproducibility.

Furthermore, in this embodiment, as a result of making smaller the intervals between light source images, it is possible to make a polarization transforming element 40 smaller in the X-axis direction, make an illuminator smaller in size and lower in cost, and in its turn, make a projector smaller in size and lower in cost. Moreover, it is possible to make a projection lens 300 smaller in size and attain a bright projected image even by using a lens being small in aperture.

[3] Third Embodiment

Next, a third embodiment of the present invention is described. This embodiment is an embodiment in which the reflecting faces of a rod facing each other in the X-axis direction are in an inversely tapered state in the same way as the second embodiment and further the reflecting faces of the rod facing each other in the Y-axis direction are in a tapered state, and is the same as a projector of the first embodiment except the shape of the rod. Therefore, the description of parts other than the rod is omitted. And it is possible also to apply variants of the components described in the first embodiment to this embodiment.

Figure 8:
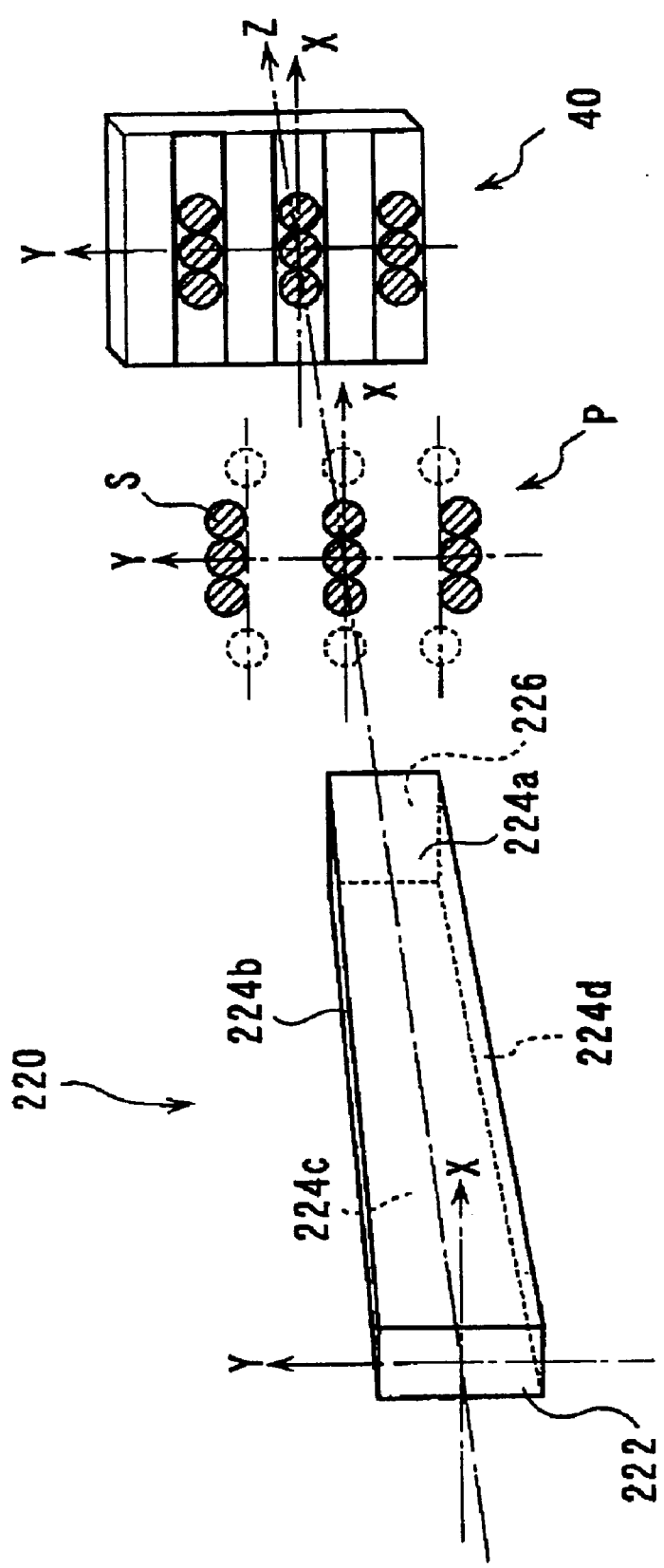
FIG. 8 is a schematic perspective view showing the relation between a rod and the position of formation of light source images in a third embodiment of the present invention.

FIG. 8 is a schematic perspective view showing the relation between a rod 220 and the position where light source images S are formed. Either of the sectional shapes of the entrance end 222 and the exit end 226 of the rod 220 is rectangular in an X-Y plane. In case of this embodiment, the shape of the exit end 226 is made substantially similar to the shape of a liquid crystal device being an area to be illuminated. A pair of reflecting faces 224*a* and 224*c* facing each other in the X-axis direction are in an inversely tapered state.

Due to this, in comparison with the rod 20 in the first embodiment, the intervals between a plurality of light source images S are made more narrow in the X-axis direction in which the pair of reflecting faces 224*a* and 224*c* being in an inversely tapered state face each other. Accordingly, this embodiment can provide the same effect as the second embodiment.

Further, in this embodiment, a pair of reflecting faces 224*b* and 224*d* facing each other in the Y-axis direction are in a tapered state. Due to this, in comparison with the rod 20 in the first embodiment, the intervals between a plurality of light source images S are made wider in the Y-axis direction in which the pair of reflecting faces 224*b* and 224*d* being in a tapered state face each other.

Hereupon, the relation between the efficiency of polarization separation of a polarization transforming element 40 and the position of incidence of light is described with reference to FIGS. 3(*a*) and 3(*b*). As described in the first embodiment, the polarization transforming element 40 separates a luminous flux which is irradiated onto the entrance face 45A and is incident on the polarization separating film 42 into a p-polarized luminous flux and an s-polarized luminous flux, reflects the S-polarized luminous flux by a reflecting film 44 in the same direction as the p-polarized luminous flux, transforms the p-polarized luminous flux into an s-polarized luminous flux by a retardation plate 48, and finally outputs s-polarized luminous fluxes. However, when the entrance end of the polarization transforming element 40 is irradiated with light, this light is incident on the polarization separating film 42 through the reflecting film 44. Therefore, in the polarization separating film 42, a p-polarized luminous flux is transmitted in the Y-axis direction and an s-polarized luminous flux is reflected in the Z-axis direction, and as a result, polarized luminous fluxes different from luminous fluxes in case of entering directly the polarization separating film 42 through the entrance face 45A are outputted from the exit faces 46A and 46B. Namely, in case of attempting to transform a non-polarized luminous flux into an s-polarized luminous flux by means of the polarization transforming element 40, since a p-polarized luminous flux is outputted, the efficiency of polarization separation is lowered. From this, it is understood that it is very important to make a luminous flux be selectively incident on only the entrance face 45A in order to obtain a high efficiency of polarization separation in the polarization transforming element 40. Namely, it is preferable to set the interval between the polarization separating film 42 and the reflecting film 44 so that the size of an entrance face 45A is larger than the size of a light source image S.

This embodiment makes wide the interval between light source images in the Y-axis direction so as to make the size of an entrance face 45A larger enough than the size of a light source image S. Accordingly, it is possible to make a luminous flux from the rod 220 be incident on only each entrance face 45A of the polarization transforming element 40 with a sufficient margin, and surely improve the efficiency of incidence of light on a polarization separating film 42. As the result, it is possible to more surely improve the efficiency of polarization separation in the polarization transforming element 40, and thereby improve the efficiency of utilizing light in a projector.

In case that a light source 11 is substantially a point light source, since the size of a light source image S can be made comparatively small, it is not necessary to make wider the intervals between light source images S in the Y-axis direction like this embodiment. Namely, this embodiment is very effective in case that the light source 11 is not very similar to a point light source and the size of a light source image S becomes large.

[4] Fourth Embodiment

Figure 9:
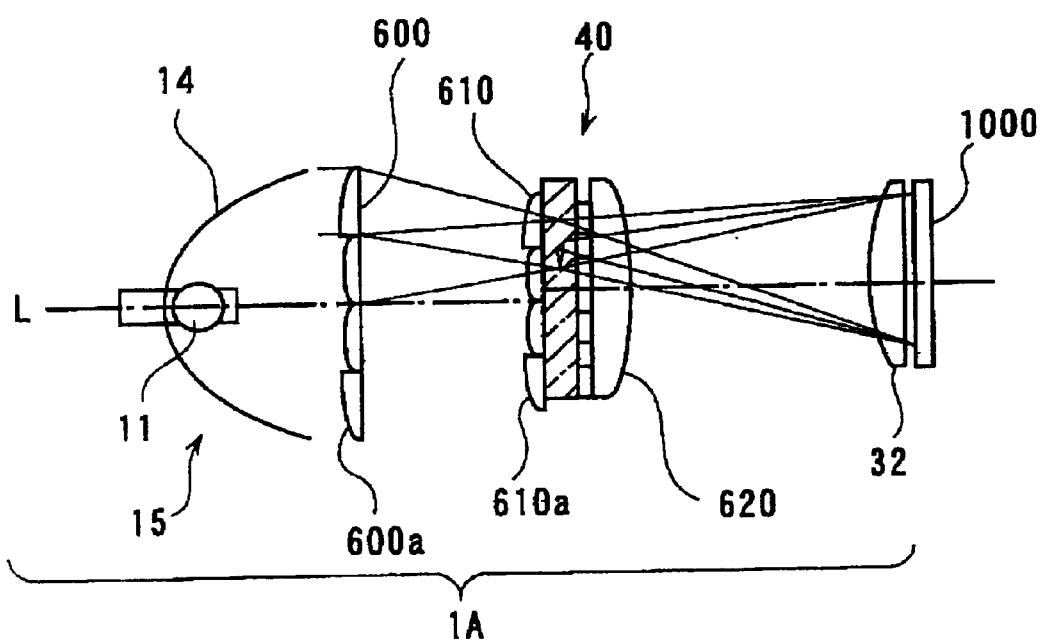
FIG. 9 is a side view showing the structure of a projector in a fourth embodiment of the present invention.
Figure 9:
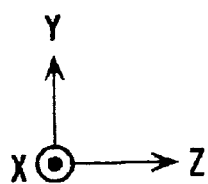

FIG. 9 is a side view showing a schematic composition of a projector seen from the X-axis direction according to a fourth embodiment of the present invention. This fourth embodiment is partially different from the first embodiment in the composition of an illuminator. This embodiment is the same as the first embodiment described above in composition except that. Therefore, the description of the same composition as the first embodiment is omitted. And variants of the respective components described in the first embodiment can be also applied to this embodiment. In all of FIG. 9 of this embodiment to FIG. 14 of a ninth embodiment described later, a mirror 13, a color separation optical element 80, a projection lens 300 and a projection screen 2000 are omitted in illustration, and an optical path from a polarization transforming element 40 to a liquid crystal device 1000 is represented as a straight line.

An illuminator 1A is provided with a light source lamp 15, a lens array 600, a first transfer lens 610, a polarization transforming element 40, a second transfer lens 620 and a parallelizing lens 32. This embodiment is characterized by using the lens array 600 composed of a plurality of condenser lenses 600a in place of a rod as a luminous flux separation optical element. The illuminator 1A separates a luminous flux emitted from the light source lamp 15 into a plurality of partial luminous fluxes by means of the lens array 600 and transforms the partial luminous fluxes into a single polarized luminous fluxes by means of the polarization transforming element 40, and then superposes them on a display area of a liquid crystal device 1000 being an area to be illuminated.

The light source lamp 15 comprises a light source 11 for emitting light and a parabolic reflector 14 for condensing light emitted from the light source 11. The reflector is not limited to a parabolic reflector, but an elliptical reflector or a spherical reflector can be used depending on arrangement of a lens array 600, transfer lenses 610 and 620, a polarization transforming element 40 and the like which are disposed at the more downstream side of the optical path than the light source 11.

The lens array 600 has a plurality of condenser lenses 600a arranged nearly in the shape of a matrix. The shape of each condenser lens 600a is set so as to be nearly similar to the shape of a display area of the liquid crystal device being an area to be illuminated. A luminous flux being incident on the lens array 600 from the light source lamp 15 is separated into a plurality of partial luminous fluxes by the condensing action of each condenser lens 600a to form light source images being the same in number as the condenser lenses 600a substantially in the shape of a matrix in an X-Y plane nearly perpendicular to the illumination optical axis L. Hereupon, each condenser lens 600a is set so as to have such a condensing characteristic that a plurality of light source images are formed only on the entrance faces 45A of the polarization transforming element 40. This embodiment controls the intervals between the light source images formed by using eccentric lenses as a part of the plurality of condenser lenses 600a.

Further, the first transfer lens 610 arranged at the entrance side of the polarization transforming element 40 has a nearly equal function to the first transfer lens 50 in the first embodiment. The first transfer lens 610 has condenser lenses 610a being equal in number to the condenser lenses 600a forming the lens array 600. In this embodiment, some of the condenser lenses 610a are formed out of eccentric lenses. The respective condenser lenses 610a are positioned correspondingly to positions of the plurality of light source images. And the condensing characteristic of each condenser lens 610a is set so that the partial luminous fluxes separated by the lens array 600 are nearly perpendicularly incident onto the entrance faces 45A of the polarization transforming element 40. Accordingly, since light can be made to be incident on the entrance faces 45A of the polarization transforming element 40 at an incidence angle of nearly zero degree, it is possible to improve the efficiency of polarization transformation. The condenser lens 610a is not limited in shape, but advantageously the shape of a rectangle or a hexagon is easy to form an array.

The second transfer lens 620 has a similar function to the second transfer lens 52 in the first embodiment, namely, a function of superposing partial luminous fluxes separated by the lens array 600 on a display area of the liquid crystal device 1000 being an area to be illuminated. In this embodiment, the second transfer lens 620 is formed out of a single axially symmetric spherical lens, but is not limited to this. For example, a lens array, a Fresnel lens, a combination lens composed of plural lenses, and the like can be also adopted. Various kinds of optical aberrations can be reduced by using such a lens. And since a Fresnel lens can be made thin in central thickness, it is advantageous to make an illuminator 1A light in weight.

This embodiment can provide a similar effect to the first embodiment. That is to say, by making some expansion of the angular distribution of an illuminating luminous flux generated in the process of polarization separation occur in the long-side direction (Y-axis direction) in which a color mixture is not liable to occur in a liquid crystal device 1000 of a spatial color separation type, it is possible to reduce a color mixture caused by leak of light to an adjacent sub-pixel and realize a projected image being high in contrast and excellent in color reproducibility.

This embodiment uses eccentric lenses as a part of the condenser lenses 600a and 610a forming the lens array 600 and the first transfer lens 610, but does not necessarily need to use eccentric lenses. And eccentric lenses can be used as all the condenser lenses 600a and 610a. And in this embodiment, the condenser lenses 610a of the lens array 600 can be set in condensing characteristic so as to make more narrow the intervals between light source images in the X-axis direction. Further, they can be also set so as to make wider the intervals between them in the Y-axis direction. By setting the condensing characteristic of each condenser lens 600a in such a manner, it is possible to obtain a similar effect to the second or third embodiment.

[5] Fifth Embodiment

Figure 10:
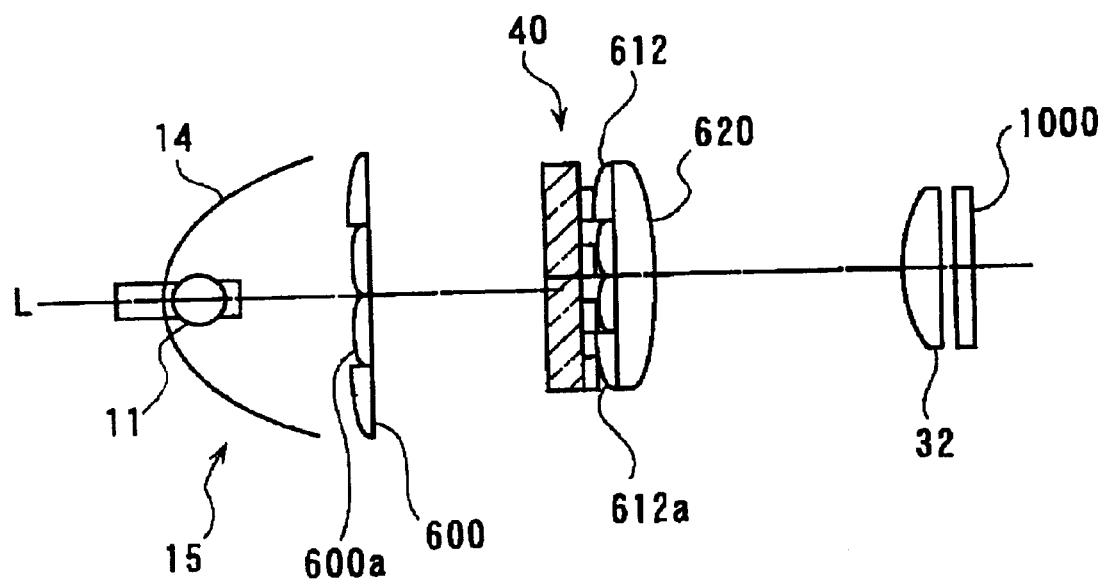
FIG. 10 is a side view showing the structure of a projector in a fifth embodiment of the present invention.

FIG. 10 is a side view showing a schematic composition of a projector according to a fifth embodiment seen from the X-axis direction. This fifth embodiment is a variant of said fourth embodiment, and is different from the fourth embodiment in that the first transfer lens is disposed between the polarization transforming element 40 and the second transfer lens 620. In the other points, it is the same as the fourth embodiment. Therefore, the description of the same composition as the fourth embodiment is omitted. And variants of the respective components described in the fourth embodiment can be also applied to this embodiment.

The first transfer lens 612 is a lens array composed of a plurality of condenser lenses 612a in the same way as the first transfer lens 610 in the fourth embodiment. The first transfer lens 610 in the fourth embodiment has a function of making a partial luminous flux be incident nearly perpendicularly onto the entrance face 45A of the polarization transforming element 40, but since the first transfer lens 612 does not have such a function since it is disposed at the exit side of the polarization transforming element 40. Therefore, this is easy to adopt in case that a luminous flux emitted from the light source lamp 15 is excellent in optical characteristic, for example, in parallelism.

A basic effect of this embodiment is similar to the effect of the fourth embodiment, but since this embodiment can reduce of the number of interfaces by forming optically the first transfer lens 612 and the second transfer lens 620 into one body, it has an effect of reducing an optical loss. And since the first transfer lens 612 can have also the function of the second transfer lens 620 together, it is possible to omit the second transfer lens 620 and make lower in cost an illuminator and in its turn a projector.

In this embodiment, the exit face 46A and the exit face 46B of the polarization transforming element 40 correspond to one condenser lens 612a, but by arranging the exit face 46A and the exit face 46B of the polarization transforming element so as to correspond respectively to the condenser lenses 612a in a one-to-one correspondence basis, namely, by forming the first transfer lens 612 using the condenser lenses 612a being double the condenser lenses 612a of FIG. 10 in number, it is possible to more improve the efficiency of utilizing light in the first transfer lens 612.

[6] Sixth Embodiment

Figure 11A:
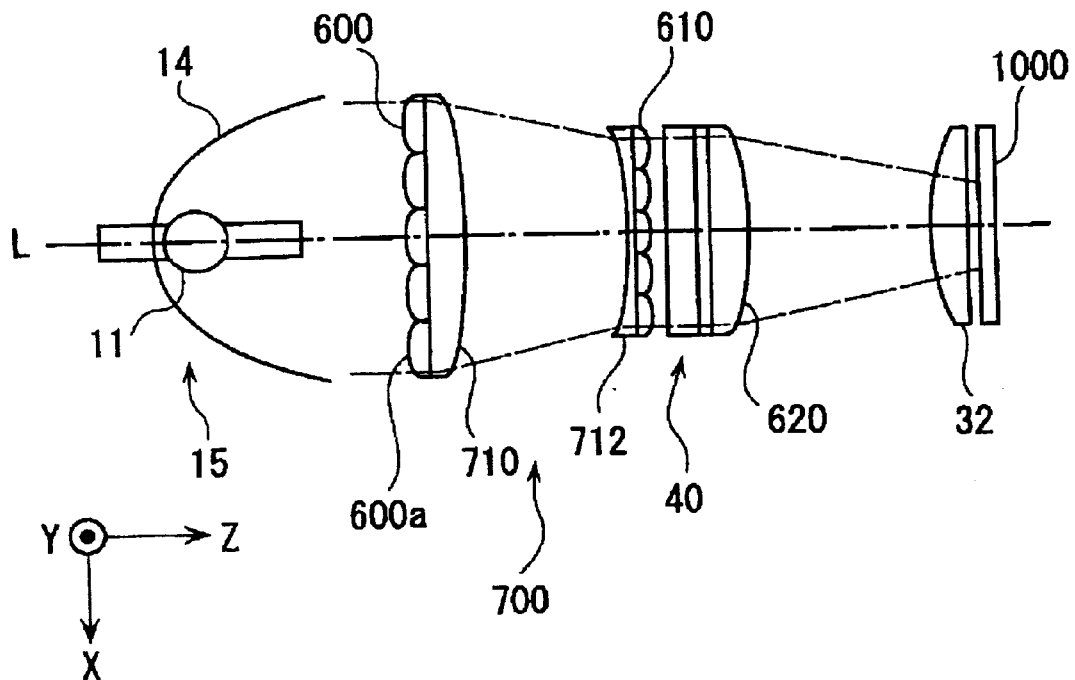
FIGS. 11(a) and 11(b) are figures showing the structure of a projector according to a sixth embodiment of the present invention.
Figure 11B:
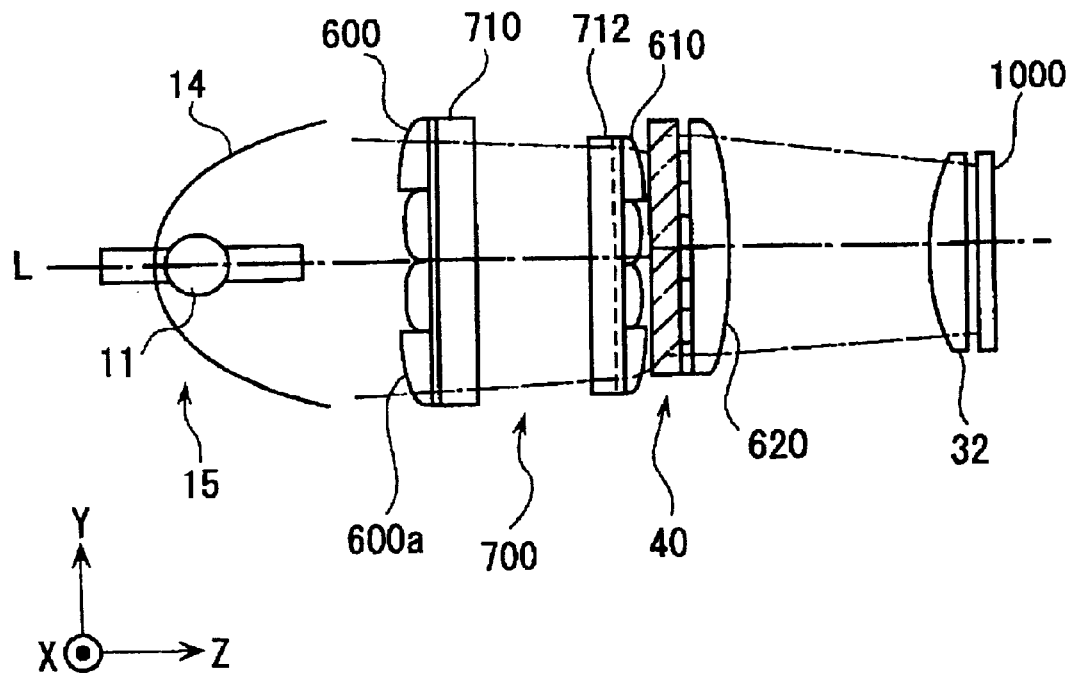

FIG. 11 shows a schematic composition of an illuminator of a projector according to a sixth embodiment, and FIG. 11(a) is a plan view of it seen from the Y-axis direction and FIG. 11(b) is a vertical sectional view seen from the X-axis direction.

This sixth embodiment is a valiant of the fourth embodiment described above, and is characterized by a fact that an afocal optical system 700 as a reducing optical system is disposed between the lens array 600 and the first transfer lens. It is the same as the fourth embodiment in the other points. Therefore, the description of the same arrangement as the fourth embodiment is omitted. And variants of the components described in the fourth embodiment can be also applied to this embodiment.

The afocal optical system 700 has a function of reducing the total diameter of a luminous flux without deteriorating very much the passing luminous flux in parallelism. In this embodiment, the afocal optical system 700 is composed of a cylindrical convex lens 710 and a cylindrical concave lens 712 each having a curvature only in the X-axis direction. A function equivalent to the cylindrical lenses 710 and 712 can be also realized by a combination lens composed of two or more lenses, and in such a case, an effect of reducing optical aberrations is obtained. The cylindrical convex lens 710 is disposed at the exit side of the lens array 600, and refracts the lights passing through the cylindrical convex lens 710 only in the X-axis direction to direct them internally toward the illumination optical axis L. On the other hand, the cylindrical concave lens 712 is disposed at the entrance side of the first transfer lens 610, and makes the lights directed internally through the cylindrical convex lens 710 nearly parallel with the illumination optical axis L. Since this embodiment uses the afocal optical system 700 composed of the cylindrical lenses 710 and 712 each having a curvature only in the X-axis direction, it is possible to further reduce the expansion of a luminous flux in the X-axis direction. Accordingly, it is possible to more reduce a color mixture caused by leak of light to an adjacent sub-pixel and realize a projected image being very high in contrast and excellent in color reproducibility. Further, as a result of reducing the expansion of a luminous flux in the X-axis direction, this embodiment can make the first transfer lens 610, the polarization transforming element 40 and the second transfer lens 620 smaller in size also in the X-axis direction, and make an illuminator smaller in size and lower in cost and in its turn a projector smaller in size and lower in cost.

And it can make also the projector lens 300 smaller and can attain a bright projected image even by using a lens small in aperture.

Furthermore, in this embodiment, since it is possible to reduce the expansion of a luminous flux in the X-axis direction without complicatedly setting the condenser lenses 600a of the lens array 600 in condensing characteristic in the X-axis direction, it is possible to easily reduce a color mixture.

This embodiment uses cylindrical lenses 710 and 712 each having a curvature only in the X-axis direction, but may use a lens having curvatures in two directions or a toric lens. By doing in such a way, it is possible to reduce the expansion of a luminous flux also in the Y-axis direction and more effectively reduce a color mixture.

[7] Seventh Embodiment

Figure 12:
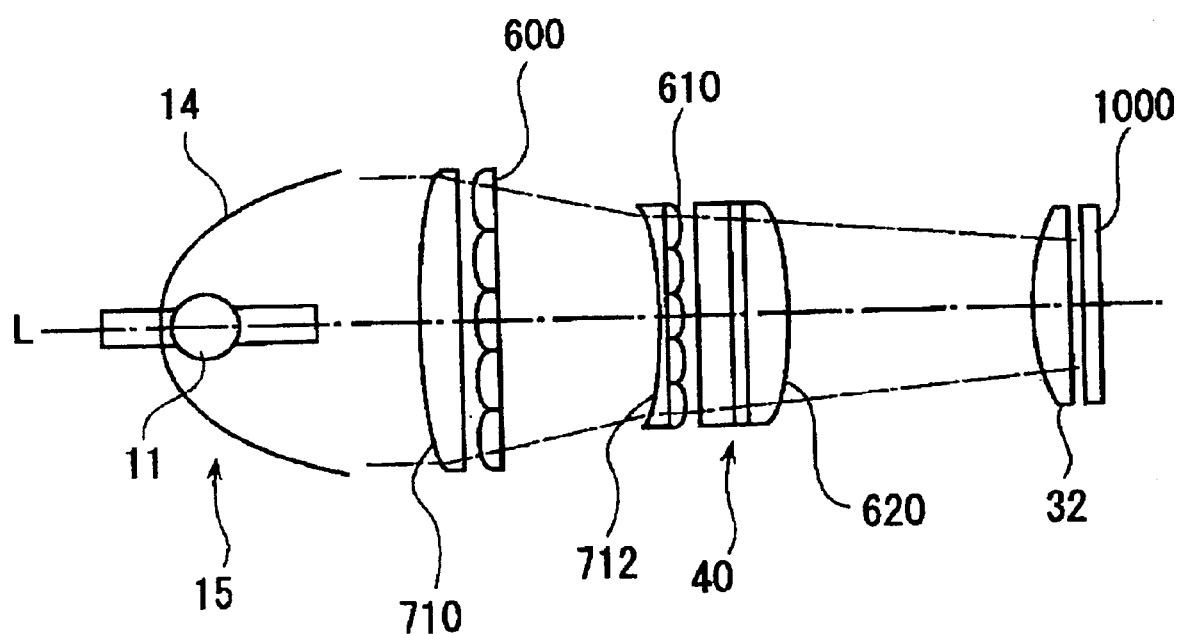
FIG. 12 is a plan view showing the structure of a projector according to a seventh embodiment of the present invention.

FIG. 12 is a plan view showing a schematic composition of a projector according to a seventh embodiment seen from the Y-axis direction. This seventh embodiment is a variant of said sixth embodiment, and is characterized by a fact that the cylindrical convex lens 710 to form the afocal optical system 700 as a reducing optical system is disposed at the entrance side of the lens array 600 as a luminous flux separation optical element. Since it is the same as the sixth embodiment in the other points, the description of them is omitted. And variants of the components described in the sixth embodiment can be also applied to this embodiment.

Even when the position of the cylindrical convex lens 710 is changed like this embodiment, an effect similar to the sixth embodiment can be attained.

The cylindrical concave lens 712 may be disposed at the exit side of the first transfer lens 610.

[8] Eighth Embodiment

Figure 13A:
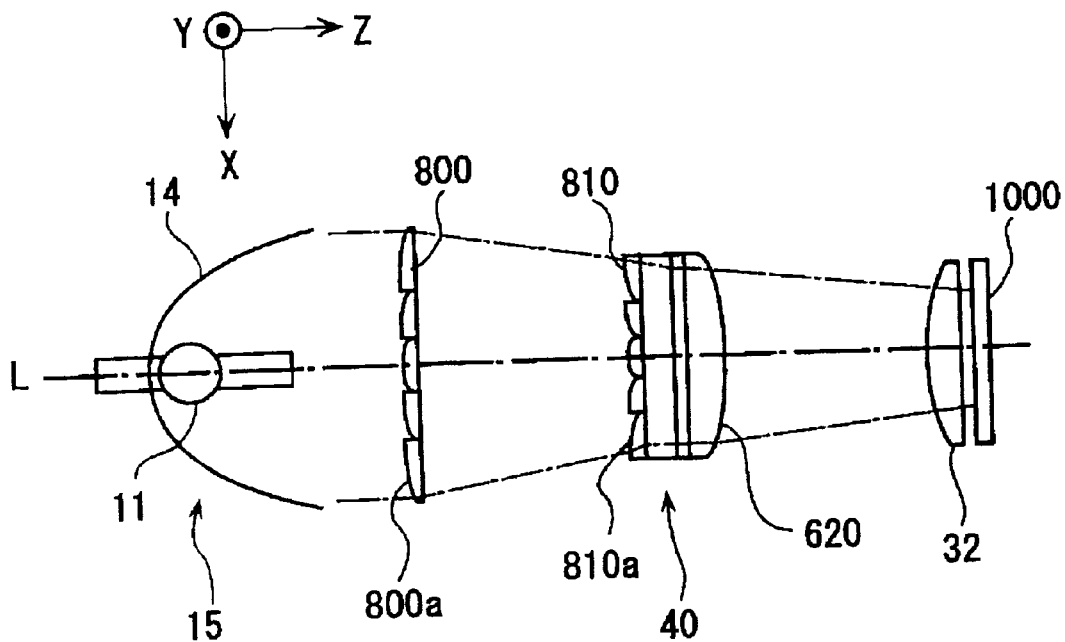
FIGS. 13(a) and 13(b) are figures showing the structure of a projector according to an eighth embodiment of the present invention.
Figure 13B:
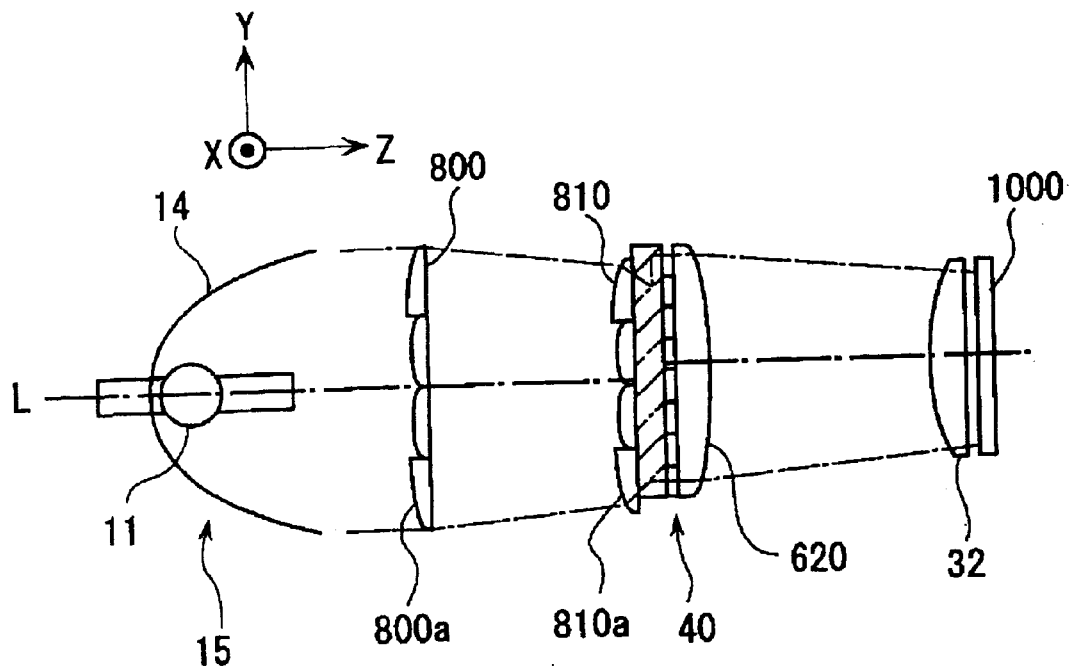

FIG. 13 shows a schematic composition of a projector according to an eighth embodiment, and FIG. 13(a) is a plan view of it seen from the Y-axis direction and FIG. 13(b) is a vertical sectional view seen from the X-axis direction.

This eighth embodiment is a variant of the sixth and seventh embodiments described above, and is characterized by a fact that the lens array 600 and the first transfer lens 610 in the sixth and seventh embodiments are made to have a function as an afocal optical system 700. That is, the function of an afocal optical system being a reducing optical system is realized at the same time by a lens array 800 being a luminous flux separation optical element and a first transfer lens 810. It is the same as the sixth and seventh embodiments in the other points. And variants of the components described in the sixth and seventh embodiments can be also applied to this embodiment.

The lens array 800 is composed of a plurality of condenser lenses 800a arranged in the shape of a matrix. A luminous flux emitted from the light source lamp 15 is separated into a plurality of partial luminous fluxes by the condensing action of each condenser lens 800a forming the lens array 800, and forms light source images being the same in number as the condenser lenses 800a in an X-Y plane substantially perpendicular to the illumination optical axis L. And the lens array 800 has also a function of refracting light in the X-axis direction so as to direct the light internally toward the illumination optical axis L in the same way as the cylindrical convex lens 710 in the sixth and seventh embodiments.

The first transfer lens 810 is composed of a plurality of condenser lenses 810a arranged in the shape of a matrix. The respective condenser lens 810a are located so as to correspond to positions where a plurality of light source images are formed. The condensing characteristic of each condenser lens 810a is set so that a partial luminous flux passing through each condenser lens 810a is nearly perpendicularly incident onto the entrance face 45A of the polarization transforming element 40. And the transfer lens 810 has also a function of making a luminous flux nearly parallel with the illumination optical axis L in the same way as the cylindrical concave lens 712 in the sixth and seventh embodiments.

This embodiment can attain also a similar effect to the sixth and seventh embodiments described above. Further, since a similar function to the afocal optical system 700 can be realized by the lens array 800 being a luminous flux separation optical element and the first transfer lens 810, it is possible to attain the reduction in size, weight and cost of an illuminator thanks to reduction of the number of component members.

[9] Ninth Embodiment

Figure 14:
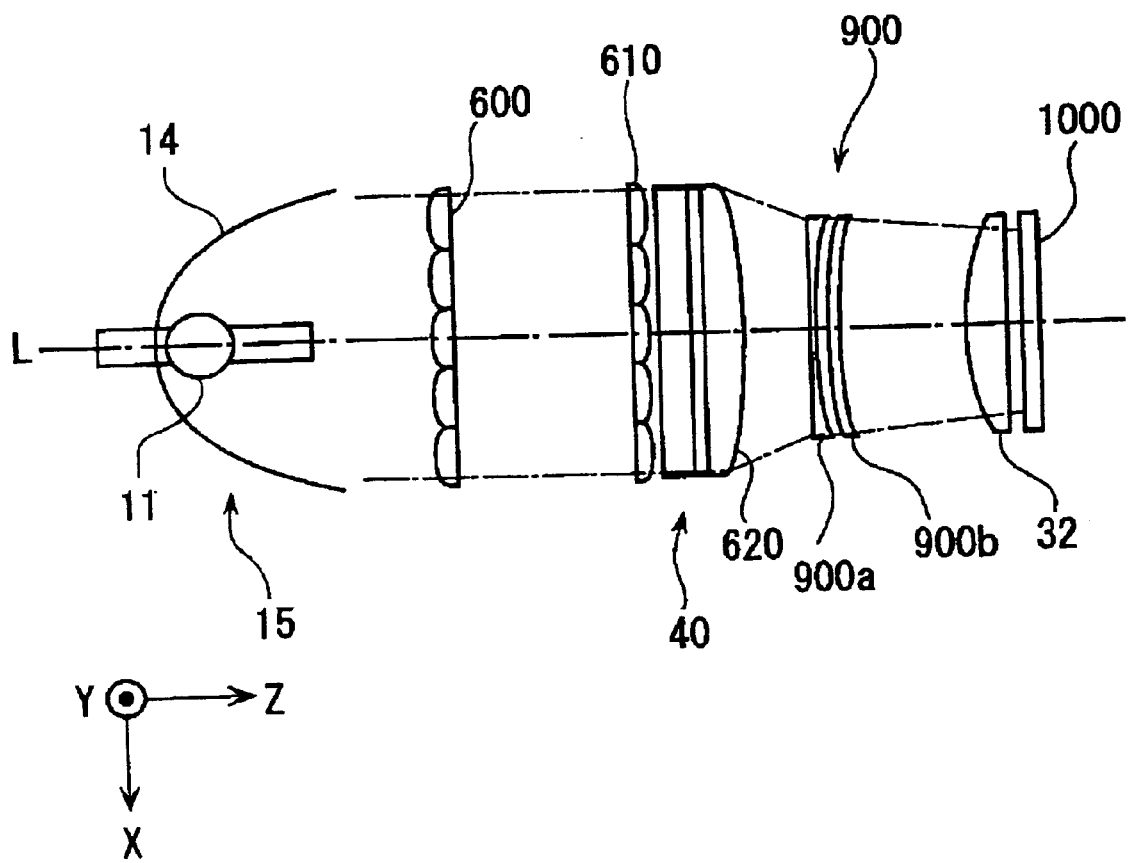
FIG. 14 is a plan view showing the structure of a projector according to a ninth embodiment of the present invention.

FIG. 14 is a plan view showing a schematic composition of a projector according to a ninth embodiment seen from the Y-axis direction.

This ninth embodiment is a variant of the fourth embodiment described above, and is characterized by a fact that a concave lens system 900 as a reducing optical system is disposed between the second transfer lens 620 and the parallelizing lens 32. It is the same as the fourth embodiment in the other points. Therefore, the description of the same composition as the fourth embodiment is omitted. And variants of the components described in the fourth embodiment can be also applied to this embodiment.

The concave lens system 900 is composed of a combination lens using two concave lenses 900a and 900b in order to reduce optical aberrations, and has a function of compressing the total diameter of a luminous flux in the X-axis and Y-axis directions. Accordingly, it can further reduce the expansion of the whole luminous flux in the Y-axis and X-axis directions. Therefore, it is possible to further reduce a color mixture caused by leak of light to an adjacent sub-pixel and attain a projected image being very high in contrast and excellent in color reproducibility. Furthermore, as a result of reducing the expansion of a luminous flux in the Y-axis and X-axis directions, this embodiment can make the projection lens 300 smaller in size and attain a bright projected image even by using a lens small in aperture.

The expansion of a luminous flux only in the X-axis direction may be reduced by using as the concave lens 900 a cylindrical concave lens having a curvature only in the X-axis direction. And the concave lens system 900 may be used in a projector using a rod like the first to third embodiments.

[10] Tenth Embodiment

Figure 15:
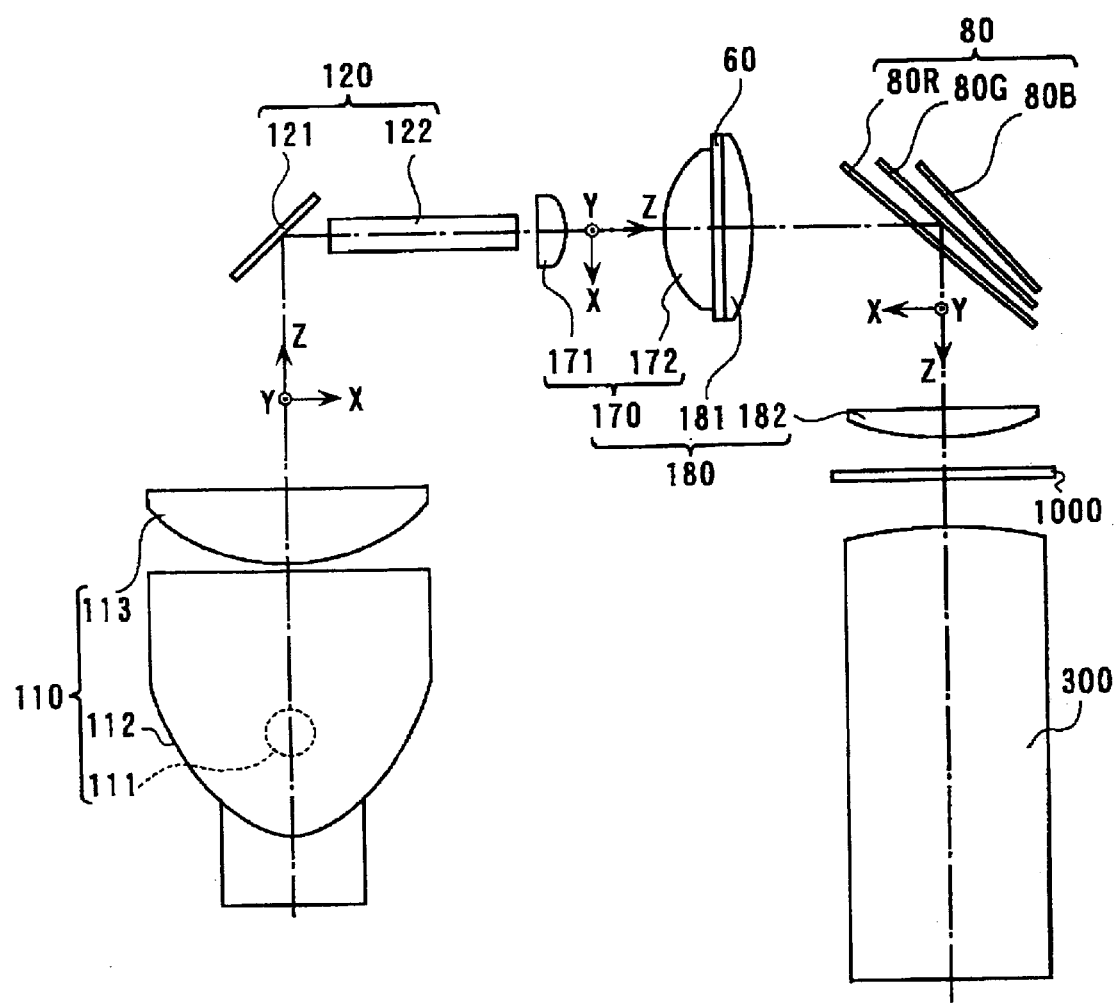
FIG. 15 is a plan view showing the structure of a projector according to a tenth embodiment of the present invention.

As shown in FIG. 15, a projector according to a tenth embodiment of the present invention is composed of a light source system 110, a luminous flux separation optical system 120, and the same color separation optical element 80, liquid crystal device 1000 and projection lens 300 as the first embodiment. And a luminous flux emitted from the light source system 110 passes through the luminous flux separation optical system 120, the color separation optical element 80, the liquid crystal device 1000 and the projection lens 300, and displays a projected image on a screen. In the optical path from the luminous flux separation optical system 120 to the liquid crystal device 1000, a polarization transforming element similar to the first embodiment and condenser lenses 171, 172, 181 and 182 are arranged. The optical path of an output luminous flux is formed in a flat U shape by a bending mirror 121 to be a reflecting mirror described later and the color separation optical element 80.

Said light source system 110 comprises a light source 111 similar to the first embodiment, a reflector 112 having a parabola-shaped reflecting face and a condenser lens 113. In this embodiment, the light source 111 is arranged near the focus of the reflector 112, and a luminous flux emitted from this light source 111 is made uniform and parallel in direction of progression by the reflector 112, and is condensed by the condenser lens 113 and outputted.

Said luminous flux separation optical system 120 is composed of a bending mirror 121 and a rod 122 being a pole-shaped optical conductor. The bending mirror 121 is arranged near the entrance end of the rod 122, and a luminous flux emitted from the light source system 110 is bent by 90 degrees by being reflected by this bending mirror 121 and is introduced to the entrance end of the rod 122. A luminous flux condensed by said condenser lens 113 is imaged on the entrance end of the rod 122 to form the primary light source images G1 (described later) on the said entrance end. Hereupon, since the bending mirror 121 is arranged midway in the course of condensation by the condenser lens 113, it has a mirror face being smaller in area than the exit face of a luminous flux by the light source 111 and the reflector 112.

Figure 16A:
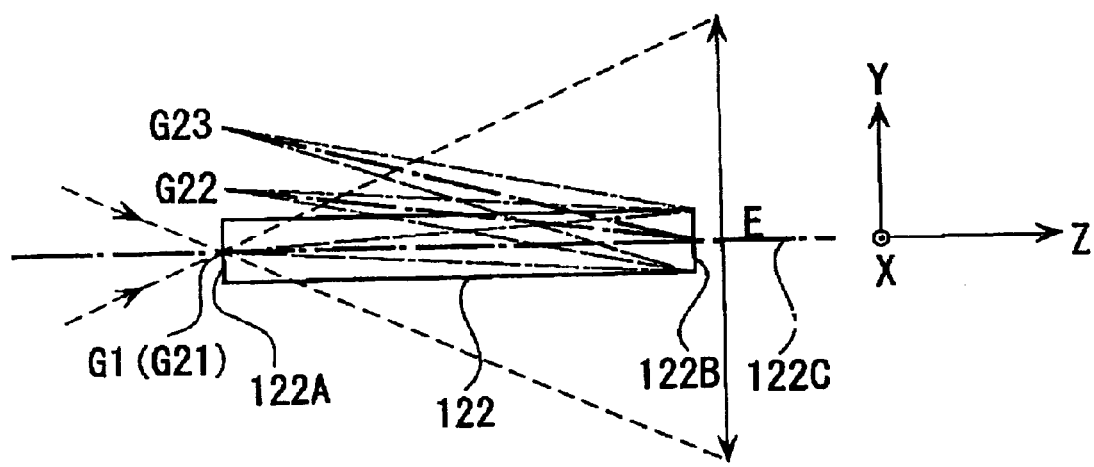
FIG. 16 is a schematic view for explaining a luminous separating action by a rod forming a uniform illumination optical system in the tenth embodiment.
Figure 18:
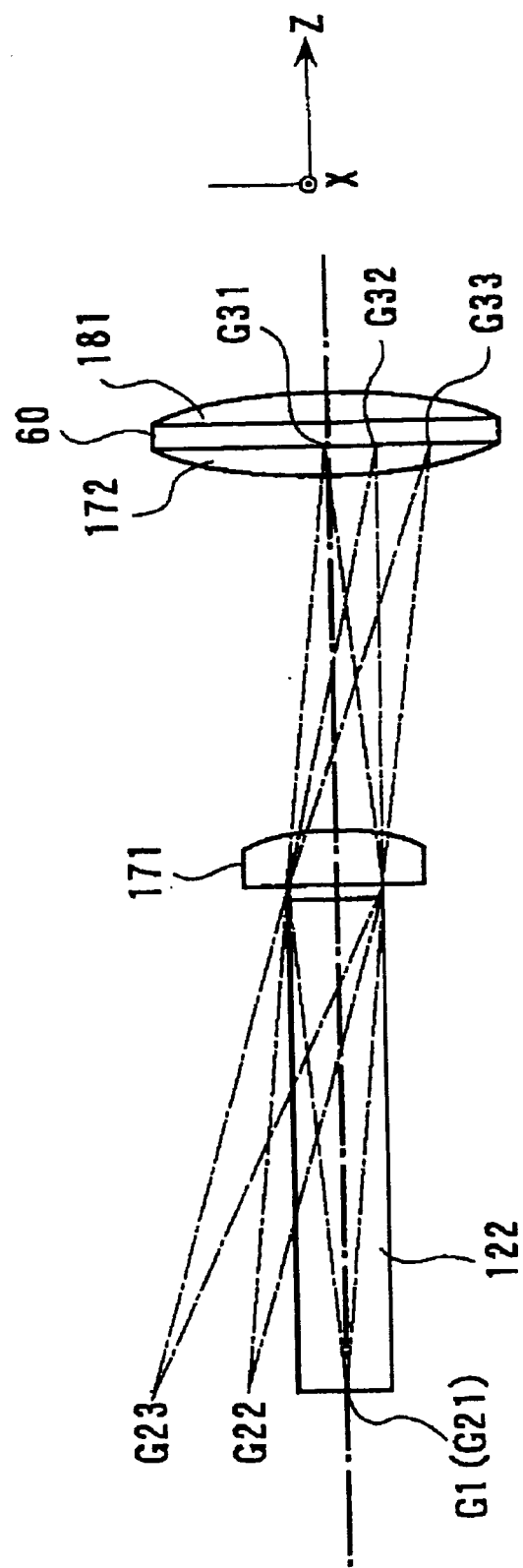
FIG. 18 is a schematic view for explaining the formation of tertiary light source images by the rod in the tenth embodiment.

As shown in FIG. 16(a), the rod 122 is an optical element for internally reflecting luminous fluxes incident on the entrance end, substantially superposing them at the exit end and outputting them, and is composed of a solid rod made of glass. A luminous flux emitted from the light source 111 is condensed by the reflector 112 and the condenser lens 113 which are a condensing means, and forms the primary light source image G1 on the entrance end of the rod 122. A luminous flux which has entered the rod 122 is separated into a plurality of partial luminous fluxes according to the position and the number of reflections in the reflecting faces, and forms a plurality of tertiary light source images G31, G32 and G33 at specific positions as shown in FIG. 18. The tertiary light source image G31 is an image of an optical component which is not reflected by internal faces of the rod 122 and is outputted. The tertiary light source image G32 is an image of an optical component which is reflected once by an internal face of the rod 122 and is outputted. The tertiary light source image G33 is an image of an optical component which is reflected twice by internal faces of the rod 122 and is outputted. On the other hand, when looking in at the rod 122 from the exit end side of the rod 122, virtual images G21, G22 and G23 can be observed in the X-Y plane including the entrance end of the rod 122. The virtual image G21 is a virtual image of an optical component which is not reflected in internal faces of the rod 122 and is outputted, the virtual image G22 is a virtual image of an optical component which is reflected once in an internal face of the rod 122 and is outputted, and the virtual image G23 is a virtual image of an optical component which is reflected twice in internal faces of the rod 122 and is outputted.

Figure 16B:
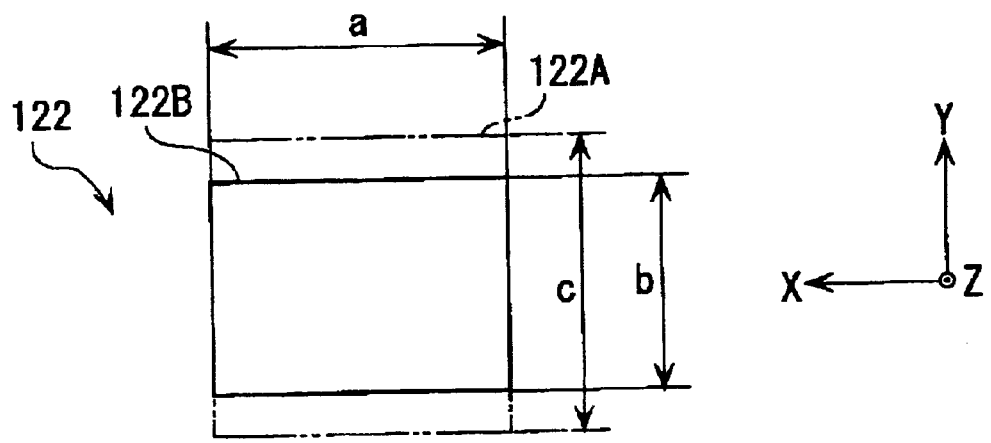

As for the sectional shape of the rod 122, as shown in FIG. 16(b), in the horizontal dimensions along the X-axis direction, the entrance end 122A and the exit end 122B both are a, but in the vertical dimensions along the Y-axis direction, while the exit end 122B is b, the exit end 122B is c larger than b. Namely, while a pair of side faces along a Y-Z plane are parallel with each other, a pair of side faces corresponding to a Z-X plane are a pair of tapered side faces separating more from each other from the exit end 122B toward the entrance end 122A.

And the ratio of a to b in the exit end 122B is nearly equal to the aspect ratio in the shape of a display area of the liquid crystal device 1000 (described later) being an area to be illuminated, and their shapes are similar to each other. The length of the rod 122 is set so that the central ray (optical axis illustrated by an alternate long and short dash line) of luminous fluxes from virtual images G21, G22, G23 and so forth being the imaginary secondary light source images passes the center of the exit end of the rod 122. At this time, when this sectional shape is set so that an incident luminous flux condensed on the entrance end of the rod 122 by the condenser lens 113 is made sufficiently smaller than the expansion E (see FIG. 16(a)) of a luminous flux which may occur in case that there is no rod, the luminous flux is partially reflected by the internal faces of the rod 122 and separated into a plurality of partial luminous fluxes according to the position and the number of reflections by the reflecting faces.

Here, internal reflections of a luminous flux which has entered the rod 122 through the entrance end 122A of it by the pair of parallel faces and the pair of tapered faces are different from each other. That is, in the internal reflections by the pair of side faces parallel with each other, since angles of incidence and reflection of a luminous flux on the side faces are always constant, a luminous flux incident on the entrance face 122A at a specific angle is outputted at the same angle as the angle of incidence relative to the exit face 122B.

Figure 17:
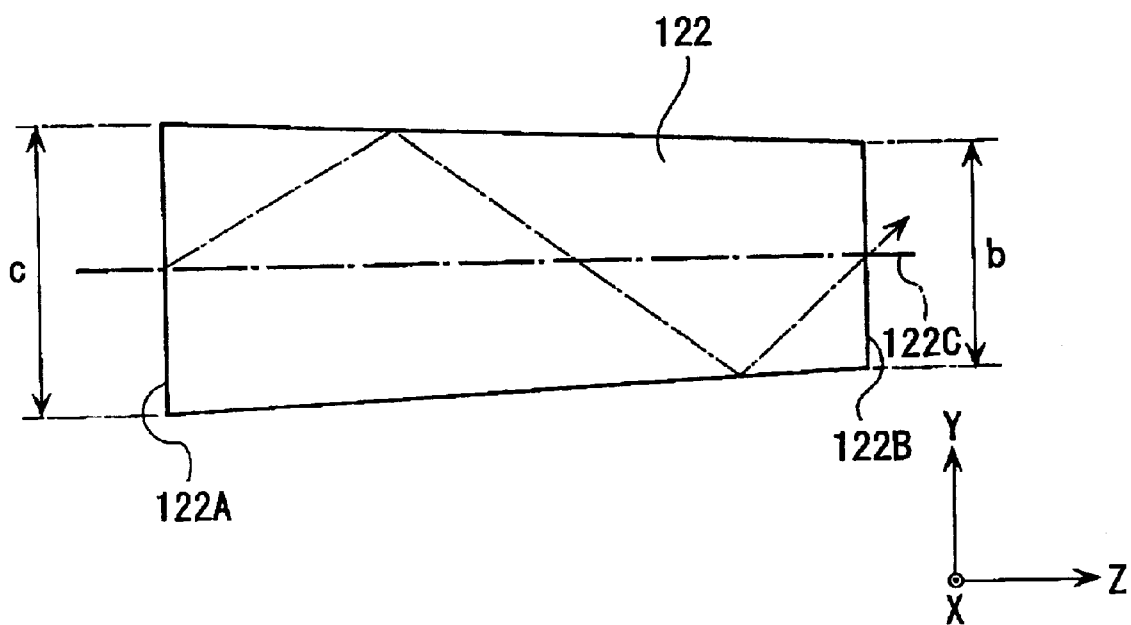
FIG. 17 is a side view of the rod in the tenth embodiment.

On the other hand, in the internal reflections by the pair of tapered side faces, as shown in FIG. 17, since the tapered side faces are inclined to the central axis 122C of the rod 122, each time the luminous flux repeats an internal reflection the angle to the central axis 122C of the rod 122 is made gradually larger, namely, the angle of incidence and reflection to the tapered side faces is made larger. Therefore, a luminous flux incident on the entrance face 122A at a specific angle is outputted at a larger angle than the angle of incidence relative to the exit face 122B.

Figure 19:
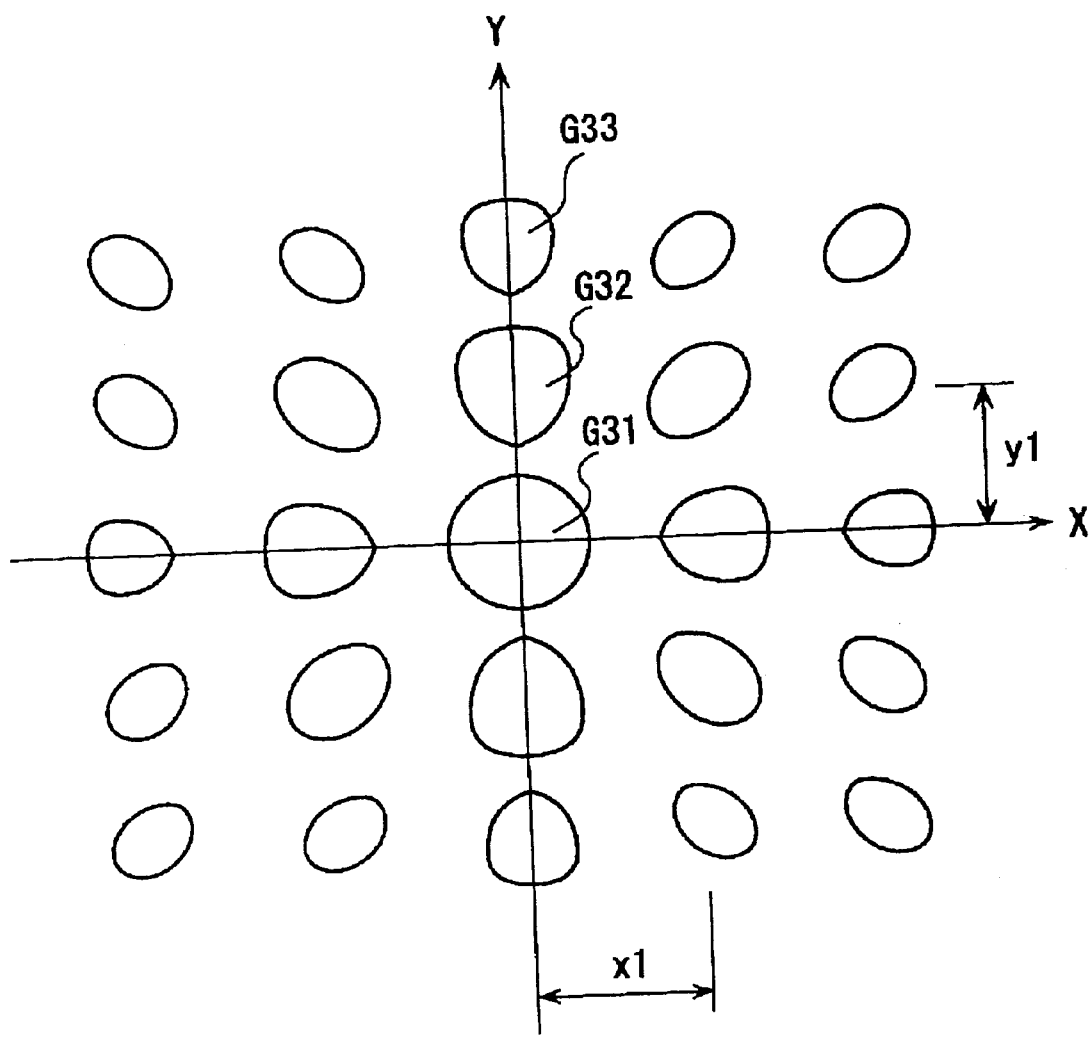
FIG. 19 is a schematic view for explaining the formation of tertiary light source images by the rod in the tenth embodiment.

As shown in FIGS. 18 and 19, the plurality of partial luminous fluxes separated by the rod 122 are condensed by condenser lenses 171 and 172 forming a first imaging optical system 170 to form the tertiary light source images G31, G32, G33 and so forth corresponding to the virtual images G21, G22, G23 and so forth being the imaginary secondary light source images on a polarization transforming element 60.

FIG. 19 is a figure for explaining a state of condensing the tertiary light source images G31, G32, G33 and so forth, and shows a state seen from the optical axis direction. The size, the number and the intervals of the tertiary light source images G31, G32, G33 and so forth are determined by the size and the angle of incidence of the primary light source image G1, and the sectional shape and the length of the rod 122, and the like. Particularly, the sizes of the tertiary light source images depend upon the size of the primary light source image, and the intervals between the tertiary light source images depend upon the shape of a section and the shape of a side face of the rod 122. That is, the intervals between the light source images vary according to the shape of the exit end 122B of the rod 122, and when the shape of the exit end 122B is a rectangle, the interval x1 between the light source images in the long-side direction (direction of a in width) is made larger than the interval y1 between the light source images in the short-side direction (direction of b in width). And the intervals between the light source images vary also according to the shape of a side face of the rod 122 to perform internal reflections, and in case that a pair of side faces corresponding to a Z-X plane are tapered, the interval y1 in the Y-axis direction as shown in FIG. 19 is made larger in comparison with a pair of ordinary parallel-side faces. Therefore, it is enough to perform polarization separation and polarization transformation using the comparatively larger intervals between the light source images in the Y-axis direction.

On the other hand, since the color separation optical element 80, the liquid crystal device 1000, the projection lens 300 and the polarization transforming element 40 are the same as those of said first embodiment, the description of them is omitted.

In said liquid crystal device 1000 (see FIGS. 5 and 6), the unit microlenses 1031A (convex parts or concave parts of the unit microlenses) of the microlens array 1031 have a pitch being three times larger than the pixel pitch in the horizontal direction (scanning direction) of the liquid crystal device 1000. And as concrete dimensions, the pixel pitch in the short-side direction of the rectangle-shaped pixel electrodes 1016R, 1016G and 1016B is set as 10.5 μm and the pixel pitch in the long-side direction is set as 31.5 μm, and the opening of the shielding portion 1015 is set as 7.5 μm in the short-side direction and 17.5 μm in the long-side direction.

Said polarization transforming element 60 is the same as the polarization transforming element 40 of said first embodiment (see FIG. 3).

Figure 20:
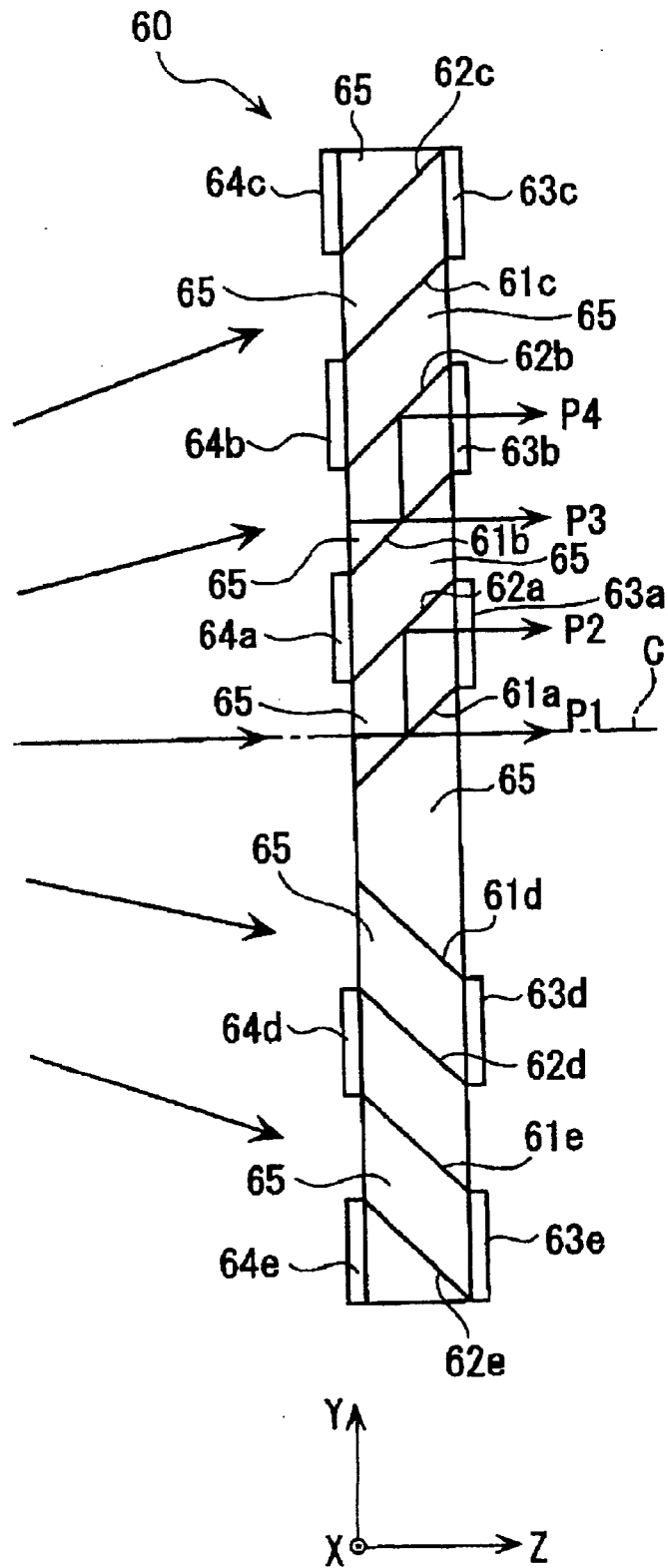
FIG. 20 is a sectional view showing the structure of a polarization transforming array which is a polarization transforming optical system in the tenth embodiment.

FIG. 20 shows a polarization transforming element 60 in this embodiment, and is a sectional view taken by a Y-Z plane. The polarization transforming element 60 comprises polarization separating films 61*a*, 61*b*, 61*c*, 61*d* and 61*e*, reflecting films 62*a*, 62*b*, 62*c*, 62*d* and 62*e*, ½-retardation plates 63*a*, 63*b*, 63*c*, 63*d* and 63*e*, shielding plates 64*a*, 64*b*, 64*c*, 64*d* and 64*e*, and a plurality of prisms 65, and these are arranged according to the state of divergence of a luminous flux being incident on the polarization transforming element 60. Concretely, these are arranged so as to be symmetrical with respect to an axis translated in the Y-axis direction from and in parallel with the optical axis C of a luminous flux being incident on the polarization transforming element 60. And since a luminous flux outputted from said rod 122 tends to diverge symmetrically with respect to its optical axis, they are formed so that the luminous fluxes are bent by the plurality of prisms so as to make the angles of incidence of the luminous flux onto the polarization separating films 61*a*, 61*b*, 61*c*, 61*d* and 61*e* be in the same direction. And the polarization separating films 61*a* and 61*d* being nearly at the central part in the Y-axis direction of the polarization transforming element 60 are disposed with a space of one pitch between them.

The polarization separating films 61*a*, 61*b*, 61*c*, 61*d* and 61*e* have a function as polarization separating means for separating an incident luminous flux into two linear polarization luminous fluxes having polarization axes nearly perpendicular to each other and outputting them in directions different from each other, and have characteristics adapted to the angles of incidence of luminous fluxes.

The reflecting films 62*a*, 62*b*, 62*c*, 62*d* and 62*e* have a function for making the s-polarized fluxes reflected by the polarization separating films 61*a*, 61*b*, 61*c*, 61*d* and 61*e* equal to the p-polarized luminous fluxes which have passed through the polarization separating films 61*a*, 61*b*, 61*c*, 61*d* and 61*e* in the direction of progression. The ½-retardation plates 63*a*, 63*b*, 63*c*, 63*d* and 63*e* have a function for turning the polarization axis of an incident s-polarized luminous flux to match with that of a p-polarized luminous flux. The shielding plates 64*a*, 64*b*, 64*c*, 64*d* and 64*e* have a function for shading luminous fluxes being incident on the reflecting films 62*a*, 62*b*, 62*c*, 62*d* and 62*e* without passing through the polarization separating films 61*a*, 61*b*, 61*c*, 61*d* and 61*e*. And each of the polarization separating films 61*a*, 61*b*, 61*c*, 61*d* and 61*e*, and the reflecting films 62*a*, 62*b*, 62*c*, 62*d* and 62*e* is formed on an inclined face of a prism 65, and this prism is joined to an inclined face of the opposite prism to it with this film between them.

The polarization transforming element 60 composed in such a way is arranged in an optical path so that said tertiary light source images G31, G32, G33 and so forth are formed near the entrance face of it and are incident on the polarization separating films 61*a*, 61*b*, 61*c*, 61*d* and 61*e*.

A luminous flux incident on between the polarization separating films 61*a* and 61*d* is not polarization-transformed and is outputted as it is. A p-polarized luminous flux out of luminous fluxes incident on the polarization separating film 61a placed in the optical axis C passes through as a p-polarized luminous flux P1. On the other hand, an s-polarized luminous flux reflected by the polarization separating film 61a is further reflected by the polarization separating film 62b and is made equal to said p-polarized luminous flux P1 in the direction of progression, and then passes through the ½-retardation plate 63a and thereby its plane of polarization is turned by about 90 degrees and it is transformed into a p-polarized luminous flux and is outputted as the p-polarized luminous flux P2. And since a luminous flux incident on the polarization separating film 61b tends to diverge, it is bent in advance in the prism 65 so as to be incident on the polarization separating film 61b at a specific angle, and then is outputted as p-polarized luminous fluxes P3 and P4 in the same way as described above. Hereafter, the polarization separating films 61c, 61d and 61e operate similarly. To use the ½-retardation plates 63a, 63b, 63c, 63d and 63e as polarization axis turning means is effective for performing a sure polarization transformation in a simple manner. This embodiment obtains a p-polarized luminous flux by means of the polarization transforming element 60, but it is possible also to obtain an s-polarized luminous flux by disposing the ½-retardation plates 63a, 63b, 63c, 63d and 63e at the exit for the p-polarized luminous flux P1.

The shielding plates 64a, 64b, 64c, 64d and 64e suppress the entry of a luminous flux different from a desired luminous flux after polarization transformation, namely, a luminous flux to be an s-polarized luminous flux after polarization transformation in this embodiment, and thereby can improve polarization of a luminous flux polarization-transformed.

Further, partial luminous fluxes made uniform in direction of polarization by the polarization transforming element 60 are superposed by the condenser lens 182 on the liquid crystal device 1000 described later. Therefore, the liquid crystal device 1000 is irradiated with a single polarized luminous fluxes being uniform in illuminance distribution in the plane.

As shown in FIG. 15, said first imaging optical system 170 is composed of the condenser lens 171 disposed near the exit end of the rod 122 and the condenser lens 172 disposed at the fore part of the polarization transforming element 60, and the entrance end of the rod 122 and the polarization separating films 61a to 61e of the polarization transforming element 60 are set in a conjugate relation to each other by these two condenser lenses 171 and 172.

Said second imaging optical system 180 comprises the condenser lenses 171 and 172 forming the first imaging optical system 170, the condenser lens 181 disposed at the hind part of the polarization transforming element 60 and the condenser lens disposed at the front stage of the liquid crystal device 1000, and the condenser lens 181 has a function as a superposing lens for superposing luminous fluxes outputted from the polarization transforming element 60 and the condenser lens 182 has a function as a parallelizing lens for parallelizing the respective color lights R, G and B to one another for the liquid crystal device 1000. And the exit end of the rod 122 and the entrance end of the liquid crystal device 1000 are set in a conjugate relation to each other by this second imaging optical system 180, and the conjugate ratio is set as not less than 4. The reason why the conjugate ratio is set as not less than 4 is that the parallelism of output luminous fluxes is improved and a color mixture caused by leak of color lights R, G and B to be outputted to pixel electrodes 1016R, 1016G and 1016B to other pixel electrodes 1016R, 1016G and 1016B is prevented, and the numerical value of a conjugate ratio 4 is determined on the basis of the following simulation.

1) Precondition of simulation

As conditions influencing the formation of virtual images being the secondary light source images, the arc length of the light source 111, the F-number of the entrance side of the rod 122 (F-number of the optical system 110), the length of the rod 122 and the pixel pitch of the liquid crystal device 1000 are conceivable, and concretely the simulation was performed using these values set in the following manner.

Arc length of the lamp: 1 mm

F-number of the light source: 1.3

Length of the rod: 60 mm (which has a pair of tapered side faces)

Pixel pitch: 10.5 $\mu$m×31.5 $\mu$m (pixel aperture: 7.5 $\mu$m×17.5 $\mu$m)

2) Parallelism required for incident lights

Taking it as a necessary condition to have such parallelism that no color mixture caused by leak of a luminous flux to enter a specific pixel to an adjacent pixel occurs and an intrinsic transmissivity of a pixel can be secured, it is necessary that the parallelism of an incident luminous flux is +/−3° or less in the short-side direction and +/−8° or less in the long-side direction.

3) Relation between conjugate ratio and parallelism

As a result of disposing an imaging optical system between the exit end 122B of the rod 122 and the liquid crystal device 1000, changing the conjugate ratio of this imaging optical system, and performing a simulation to examine what range of parallelism 90% of luminous fluxes incident on pixels of the liquid crystal device 1000 are kept in, the relation shown in Table 1 was obtained.

TABLE 1

| Conjugate ratio | Horizontal parallelism | Vertical parallelism |
| --- | --- | --- |
| 3 | 4.8 | 6.8 |
| 4 | 4.0 | 5.6 |
| 5 | 8.2 | 4.9 |

According to the above result, it is only the case of a conjugate ratio of 5 that nearly meets the parallelism of 2), but when actually observing the degree of color mixture of transmitted lights of the liquid crystal device 1000, it has been judged that even a conjugate ratio of 4 provides an acceptable level of color mixture.

From the above result of simulation, it is understood that by using the second imaging optical system 180 having a conjugate ratio of not less than 4, it is possible to secure the parallelism of luminous fluxes incident on the pixel electrodes of the liquid crystal device 1000 and prevent a color mixture from occurring in a projected image.

This embodiment has the following effects.

That is to say, since the direction in which the other polarized luminous fluxes are reflected by the polarization separating films 61a, 61b, 61c, 61d and 61e of the polarization transforming element 60 is nearly perpendicular to the plane (X-Z plane) determined by the central axis of a luminous flux incident on the dichroic mirrors 80R, 80G and 80B of the color separation optical element 80 and the central axes of luminous fluxes reflected by the dichroic mirrors 80R, 80G and 80B, a luminous flux outputted from the polarization transforming element 60 diverges in directions perpendicular to the direction of color separation of a plurality of color lights. Since this output luminous flux diverges in the long-side direction of the rectangle-shaped pixel electrodes 1016R, 1016G and 1016B of the respective color lights R, G and B in the liquid crystal device 1000, for example a color light G to a pixel electrode 1016G leaks less to other pixel electrodes 1016R and 1016B and it is possible to prevent a color mixture from occurring in a projected image.

And since the conjugate ratio of the second imaging optical system 180 is set as not less than 4, it is possible to secure the parallelism of the color lights R, G and B incident on the liquid crystal device 1000 and more surely prevent occurrence of a color mixture in a projected image.

Further, since the color separation optical system 80 is disposed between the condenser lens 181 being a superposing lens and the condenser lens 182 being a parallelizing lens which form the second imaging optical system having a conjugate ratio of not less than 4, it is possible to secure a necessary conjugate ratio even in a small space by bending a luminous flux by means of the dichroic mirrors 80R, 80G and 80B, and make a projector 1 smaller in size by arranging the color separation optical system 80 without influencing other optical systems.

And since the rod 122 having a pair of tapered side faces being gradually wider from the exit end 122B toward the entrance end 122A in the direction perpendicular to the plane determined by the central axes of an incident luminous flux and its reflected luminous flux on the dichroic mirrors 80R, 80G and 80B forming the color separation optical system 80 is adopted, the intervals between the tertiary light source images G31, G32, G33 and so forth formed on the polarization transforming element 60 are made wider, and luminous fluxes to be incident on the polarization separating films 61*a*, 61*b*, 61*c*, 61*d* and 61*e* are increased in quantity and thereby the efficiency of polarization transformation is improved.

And since the bending mirror 21 to be a reflecting mirror, and the dichroic mirrors 80R, 80G and 80B of the color separation optical system 80 are arranged in an optical path, the optical path from the light source to the projection lens 300 can be made U-shaped in a Z-X plane so as to be more advantageous for making a projector 1 smaller in size. And since the bending mirror 21 is arranged midway in the course of condensation of the condenser lens 113 as a result of disposing the bending mirror 21 between the condenser lens 113 and the entrance end 122A of the rod 122, the bending mirror 21 can be made smaller and this is also advantageous for making the projector 1 smaller.

Further, since the polarization transforming element 60 is composed so as to transform s-polarized luminous fluxes (to the polarization separating films 61*a*, 61*b*, 61*c*, 61*d* and 61*e*) into p-polarized luminous fluxes, a single luminous fluxes are provided to the dichroic mirrors 80R, 80G and 80B of the color separation optical system at the hind stage and the efficiency of reflection and thereby it is possible to provide a projector 1 capable of efficiently utilizing a luminous flux emitted from the light source system 110.

And since the reflecting faces of the polarization separating films 61*a*, 61*b*, 61*c*, 61*d* and 61*e* of the polarization transforming element 60 are arranged according to the state of divergence of an incident luminous flux onto the polarization transforming element 60, polarization separation can be efficiently performed according to the diverged luminous flux outputted from the exit end 122B of the rod 122 and thereby the polarization separation characteristics are improved.

And since the polarization separating films 61*a* and 61*d* of the polarization transforming element 60 are arranged with a space of one pitch between them and about half a luminous flux incident on this area can be used as an illuminating light, a polarization transforming array having a little optical loss can be obtained.

[11] Variants of the embodiments

The present invention is not limited to the above-mentioned embodiments but can be variously modified in the scope of the invention.

For example, in said tenth embodiment, the rod 122 is formed out of a solid rod made of a material having an optical conductivity, but it may be a tube-shaped hollow rod formed out of a member having light reflecting faces, for example, reflecting mirrors (preferably, surface reflection mirrors). In such a case, light is reflected by a reflecting face directed inward a hollow rod and propagates through the air being lower in refractive index in comparison with glass and the like. As a reflecting face, a general reflecting mirror, a reflecting mirror having a reflecting film enhanced by a dielectric or the like formed on the surface of it, and the like can be used. Since a hollow rod is easier to manufacture than a solid rod made of a lump of an optically conductive material, the hollow rod can make an illuminator lower in cost than a solid rod. Further, since the inside of a hollow rod is filled with air being nearly equal to 1 in refractive index, the length in the Z-axis direction of the rod 122 can be made shorter than a solid rod being more than 1 in refractive index, and there is the possibility that an illuminator is made smaller and in its turn a projector is made smaller in size.

Figure 21:
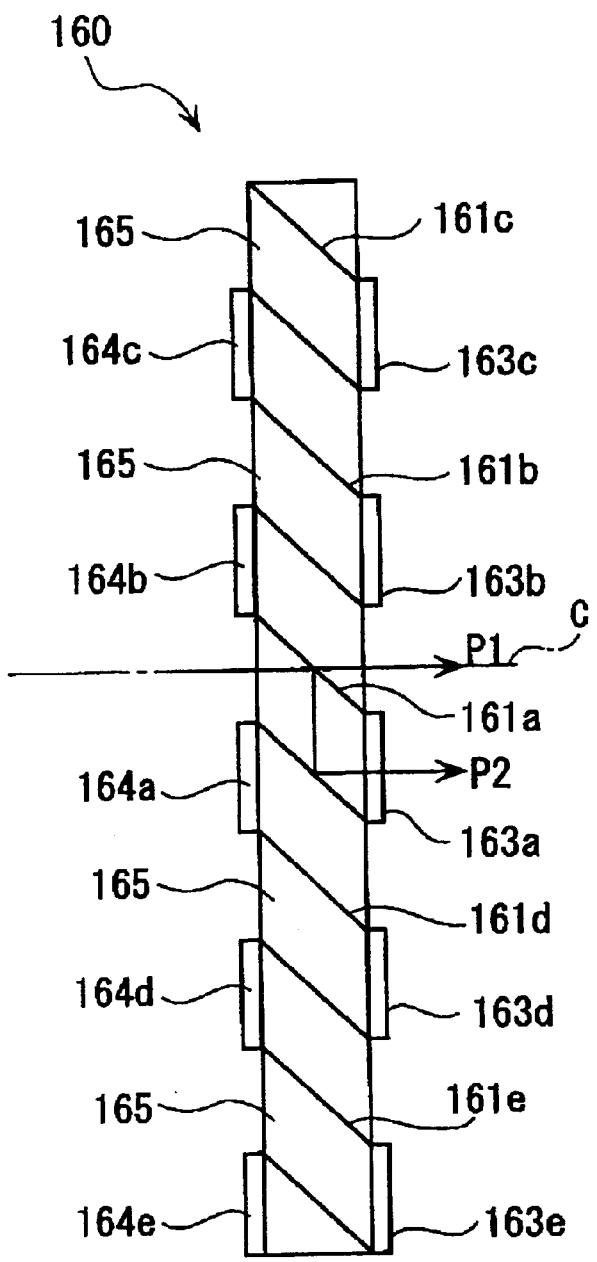
FIG. 21 is a sectional view showing the structure of a polarization transforming array which is a polarization transforming optical system being a variant of the tenth embodiment.
Figure 21:
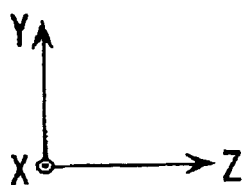

In said tenth embodiment, although the polarization separating films 61*a*, 61*b*, 61*c*, 61*d* and 61*e* of the polarization transforming element 60 are arranged according to the state of divergence of an output luminous flux from the rod 122, they are not limited to this but a polarization transforming element such as the polarization transforming element 40 used in the first to ninth embodiments may be used. That is, as shown in FIG. 21, it is possible also to adopt a polarization transforming element 160 in which polarization separating films 161*a*, 161*b*, 161*c* and so forth are inclined in a fixed direction with respect to the optical axis C, the reflecting faces of the polarization separating films 161*a*, 161*b*, 161*c* and so forth are arranged in parallel with one another, and ½-retardation plates 163*a*, 163*b* and so forth are adhered onto the exit sides of them and shielding plates 164*a*, 164*b* and so forth are adhered onto the entrance sides of them. According to such a polarization transforming element 160, since a polarization transforming element 160 can be manufactured only by arranging alternately the polarization separating films 161*a*, 161*b*, 161*c* and so forth and the reflecting films 162*a*, 162*b* and so forth on the respective inclined faces of each prism 165 whose side face is in the shape of a triangle or a parallelogram, it is possible to make it easy to manufacture a polarization transforming optical system.

In the first to ninth embodiments, the polarization transforming element 60 of the tenth embodiment may be used in place of the polarization transforming element 40.

And in the tenth embodiment, although the polarization transforming element 60 polarization-transforms and outputs s-polarized luminous fluxes (to the polarization separating films 61*a*, 61*b*, 61*c*, 61*d* and 61*e*) out of luminous fluxes outputted from the rod 122 in parallel with p-polarized luminous fluxes, they are not limited to this, but it is possible also to adopt a polarization transforming optical system which polarization-transforms all luminous fluxes into s-polarized luminous fluxes. In this case, it is enough to only dispose a ½-retardation plate at a part through which a p-polarized luminous flux is outputted, and it is not necessary to change the structure of other parts of the polarization transforming element 60 of said embodiment.

Further, although the rod 122 having a pair of tapered side faces perpendicular to the Y-axis direction is adopted in said tenth embodiment, it is not limited to this but a rod in the shape of a rectangular parallelepipedon whose entrance and exit faces have the same shape may be adopted.

As the liquid crystal device 1000 in the above embodiments, in addition to a twisted-nematic type it is possible to use liquid crystal devices of various types such as a ferroelectric type, antiferroelectric type, horizontal orientation type, vertical orientation type and the like.

And although the liquid crystal device 1000 in said embodiments uses a TFT 1017 as a switching element, it is not limited to this but it can use also a two-terminal type nonlinear element such as a TFD (Thin-Filmed Diode) and the like.

Further, although said embodiments have been described assuming a projector using a transmission type liquid crystal device of a spatial color separation type, the present invention can be also applied to a projector using a reflection type liquid crystal device of a spatial color separation type.

And a projector may be either of a rear type for projecting an image on the back of a screen or a front type for projecting an image on the front of a screen.

Additionally to them, a concrete structure and shape in implementing the present invention may be another structure and the like in the scope in which the objects of the present invention can be attained.

What is claimed is:

1. A projector, comprising:
   a luminous flux separation optical element for separating a luminous flux from a light source into a plurality of partial luminous fluxes;
   a polarization transforming element for separating each of said plurality of partial luminous fluxes into two polarized luminous fluxes and then transforming the two luminous fluxes into a single polarized luminous flux;
   a color separation optical element for separating the polarized luminous flux into a plurality of color lights;
   an electro-optic device for modulating an illuminating luminous flux outputted from said polarization transforming element; and
   a projection lens for projecting a luminous flux modulated by said electro-optic device;
   wherein said electro-optic device is provided with a plurality of pixels, the pixels each having long-side and short-side directions respectively corresponding to color lights and being arranged adjacently to one another in order to apply an optical modulation process onto each of the color lights entered at different angles for each partial luminous flux, and
   wherein a direction of polarization separation of said plurality of partial luminous fluxes by said polarization transforming element approximately coincides nearly with the long-side direction of said pixel.

2. The projector according to claim 1, wherein;
   said electro-optic device is a transmission type electro-optic device that modulates an incident luminous flux with said pixels and outputting the luminous flux at a side opposite to an entry side.

3. The projector according to claim 1, wherein the color seperation optical element comprises a plurality of mirrors for selectively reflecting said plurality of color lights, the plurality of mirrors being arranged at mutually different angles, the color separation optical element being disposed between said polarization transforming element and said electro-optic device.

4. The projector according to claim 1, wherein said luminous flux separation optical element forms a plurality of light source images at narrower intervals in the short-side direction of said pixel than the long- side direction thereof.

5. The projector according to claim 4, wherein said luminous flux separation optical element is a rod that reflects a luminous flux from said light source entered through an entrance end by plural pairs of reflecting faces and that separates the luminous flux into a plurality of partial luminous fluxes to output from an exit end, said rod having a pair of reflecting faces opposing with each other in the short-side direction of said pixel and being inclined to be gradually wider from the entrance and toward the exit end.

6. The projector according to claim 5, wherein said rod has a pair of reflecting faces opposing with each other in the long-side direction of said pixel and being inclined to be gradually narrower from said entrance end toward said exit end.

7. The projector according to claim 4, wherein said luminous flux separation optical element is a lens array formed by arranging a plurality of lenses in the long-side and short-side directions of said pixel.

8. The projector according to claim 7, wherein:
   at least a part of said plurality of lenses forming said luminous separation optical element is an eccentric lens.

9. The projector according to claim 7, further comprising a reducing optical system provided between said light source and said polarization transforming element that reduces total sectional dimensions of said illuminating luminous flux in the short-side direction of said pixel.

10. The projector according to claim 9, wherein:
    said reducing optical system further reduces the total sectional dimensions of said illuminating luminous flux also in the long-side direction of said pixel.

11. The projector according to claim 7, further comprising a reducing optical system provided between said polarization transforming element and said electro-optic device that reduces total sectional dimensions of said illuminating luminous flux in the short-side direction of said pixel.

12. The projector according to claim 11, wherein:
    said reducing optical system further reduces the total sectional dimensions of said illuminating luminous flux also in the long-side direction of said pixel.

13. The projector according to claim 1, said polarization transforming element comprising: a polarization separating film that transmits one of the two polarized luminous fluxes and reflecting the other; a reflecting film that reflects the other polarized luminous flux; and a retardation plate that aligns a polarization direction of said two polarized luminous fluxes.

14. The projector according to claim 13, further comprising:
    a first imaging optical system that conjugates an entrance end of said luminous flux separation optical element and said polarization transforming element; and
    a second imaging optical system that conjugates an exit end of said luminous flux separation optical element and said electro-optic device, wherein:
    the conjugate ratio of the second imaging optical system is not less than 4.

15. The projector according to claim 14, said second imaging optical system comprising a superposing lens to be disposed at a hind stage of said polarization transforming element and a parallelizing lens to be disposed at a fore stage of said electro-optic device, wherein said color separation optical element is disposed between the superposing lens and the parallelizing lens.

16. A single-plate type projector, comprising:

a light source;

a polarization transforming optical element comprising a polarization separating film for transmitting one of two polarized luminous fluxes and for reflecting the other of the two polarized luminous fluxes, a reflecting film for reflecting the other of the two polarized luminous fluxes reflected by said polarization separating film nearly in a same direction as said one of the two polarized luminous fluxes, and a retardation plate for aligning a polarization direction of said two polarized luminous fluxes;

a color separation optical element for separating the polarized luminous flux outputted from said light source into a plurality of color lights, said color separation optical element comprising a plurality of mirrors; and an electro-optic device for inputting the color lights separated by said color separation optical element thereinto from mutually different directions and modulating the respective color lights according to an image information to form an optical image, wherein the direction for the other of the two polarized luminous fluxes to be reflected by said polarization separating film is approximately perpendicular to a plane defined by a central axis of a luminous flux incident on said mirror and a central axis of the luminous flux reflected by said mirror.

17. The projector according to claim 16, further comprising:

a luminous flux separation optical element having a pole-shaped optical conductor that separates a luminous flux from said light source into a plurality of partial luminous fluxes, said luminous flux separation optical element being disposed at a fore stage of said polarization transforming optical system;

a first imaging optical system that conjugates an entrance end of said optical conductor and said polarization transforming element; and a second imaging optical system that conjugates an exit end of said optical conductor and said electro-optic device, wherein the conjugate ratio of the second imaging optical system is not less than 4.

18. The projector according to claim 17, said second imaging optical system comprising a superposing lens disposed at a hind stage of said polarization transforming element and a parallelizing lens disposed at a fore stage of said electro-optic device, said color separation optical element being disposed between the superposing lens and the parallelizing lens.

19. The projector according to claim 17, wherein said optical conductor is provided with tapered sides whose dimensions in a direction perpendicular to the plane defined by the central axis of the luminous flux incident on said mirror and the central axis of the luminous flux reflected by said mirror becomes gradually wider from the exit end of said optical conductor toward the entrance end.

20. The projector according to claim 17, further comprising:

a reflecting mirror provided between said light source and said optical conductor that reflects and supplies an output luminous flux from said light source to the entrance end of said optical conductor.

21. The projector according to claim 20, wherein:

an incident direction of a luminous flux incident on said reflecting mirror is parallel with an output direction of the luminous fluxes outputted from the plurality of mirrors forming said color separation optical system.

22. The projector according to claim 16, wherein said other polarized luminous flux is an s-polarized luminous flux relative to said polarization separating film, and the s-polarized luminous flux is transformed into a p- polarized luminous flux by said retardation plate.

23. The projector according to claim 16, said polarization transforming optical system comprising a plurality of said polarization separating films, the plurality of polarization separating films being parallel to each other.

24. The projector according to claim 16, said polarization transforming optical system comprising a plurality of said polarization separating films, the plurality of polarization separating films being arranged according to a state of divergence of an incident luminous flux.

* * * * *